(12) United States Patent
Patel et al.

(10) Patent No.: US 8,429,707 B2
(45) Date of Patent: Apr. 23, 2013

(54) METHOD AND APPARATUS FOR INTERACTING WITH A SET-TOP BOX BASED ON SENSOR EVENTS FROM A USER DEVICE

(75) Inventors: Naman Patel, Gujarat (IN); T. Sahaya George, TamilNadu (IN); Balamuralidhar Maddali, Chennai (IN); Madankanth Lanka, Andra Pradesh (IN); Thalha Yasir Refaye, Chennai (IN); Vasanthakumar Sarpasayanam, Pondicherry (IN); Varaprasad Meka, Karnataka (IN); Abhishek Malhotra, Saharanpur (IN); Sampath Raman, Tamil Nadu (IN); Sankaran Raman, Chennai (IN); Praveen Prabhaharan, Andhra Pradesh (IN); Raju Ramakrishnan, Hosur (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 254 days.

(21) Appl. No.: 12/850,424

(22) Filed: Aug. 4, 2010

(65) Prior Publication Data

US 2012/0036549 A1 Feb. 9, 2012

(51) Int. Cl.
*H04N 7/173* (2011.01)
*H04N 7/16* (2011.01)

(52) U.S. Cl.
USPC ............................ 725/141; 725/133; 725/153

(58) Field of Classification Search .................. 725/106, 725/133, 141, 153; 709/224
See application file for complete search history.

(56) References Cited

U.S. PATENT DOCUMENTS

| | | | |
|---|---|---|---|
| 5,671,267 A * | 9/1997 | August et al. ................. | 455/420 |
| 2009/0100474 A1 * | 4/2009 | Migos .............................. | 725/61 |
| 2009/0247152 A1 * | 10/2009 | Manne ........................ | 455/426.2 |
| 2010/0254370 A1 * | 10/2010 | Jana et al. ..................... | 370/352 |

* cited by examiner

*Primary Examiner* — Hunter B Lonsberry

(57) ABSTRACT

An approach is provided for controlling a set-top box based on sensor triggered events on a user device. A set-top box receives a control message from a user device, wherein the control message specifies an event corresponding to one or more sensors of the user device. The set-top box maps the event to an activity associated with an application that is executed by the set-top box. Also, the set-top box presents media content provided by the application according to the mapped activity.

18 Claims, 14 Drawing Sheets

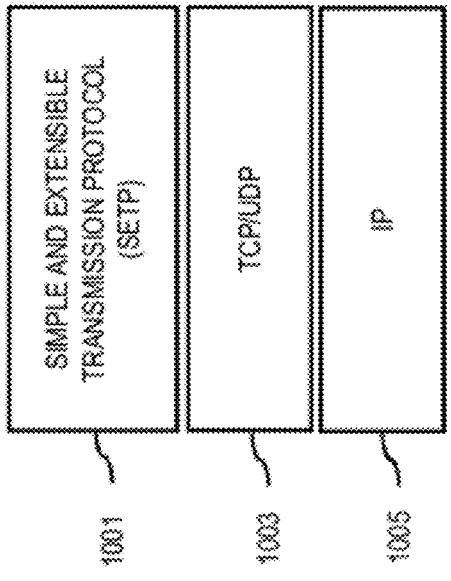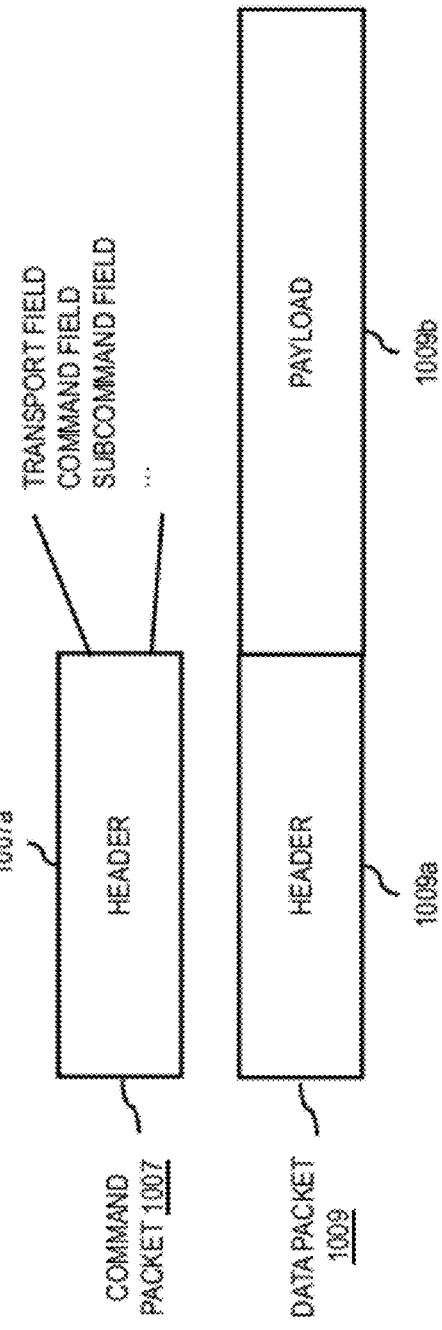

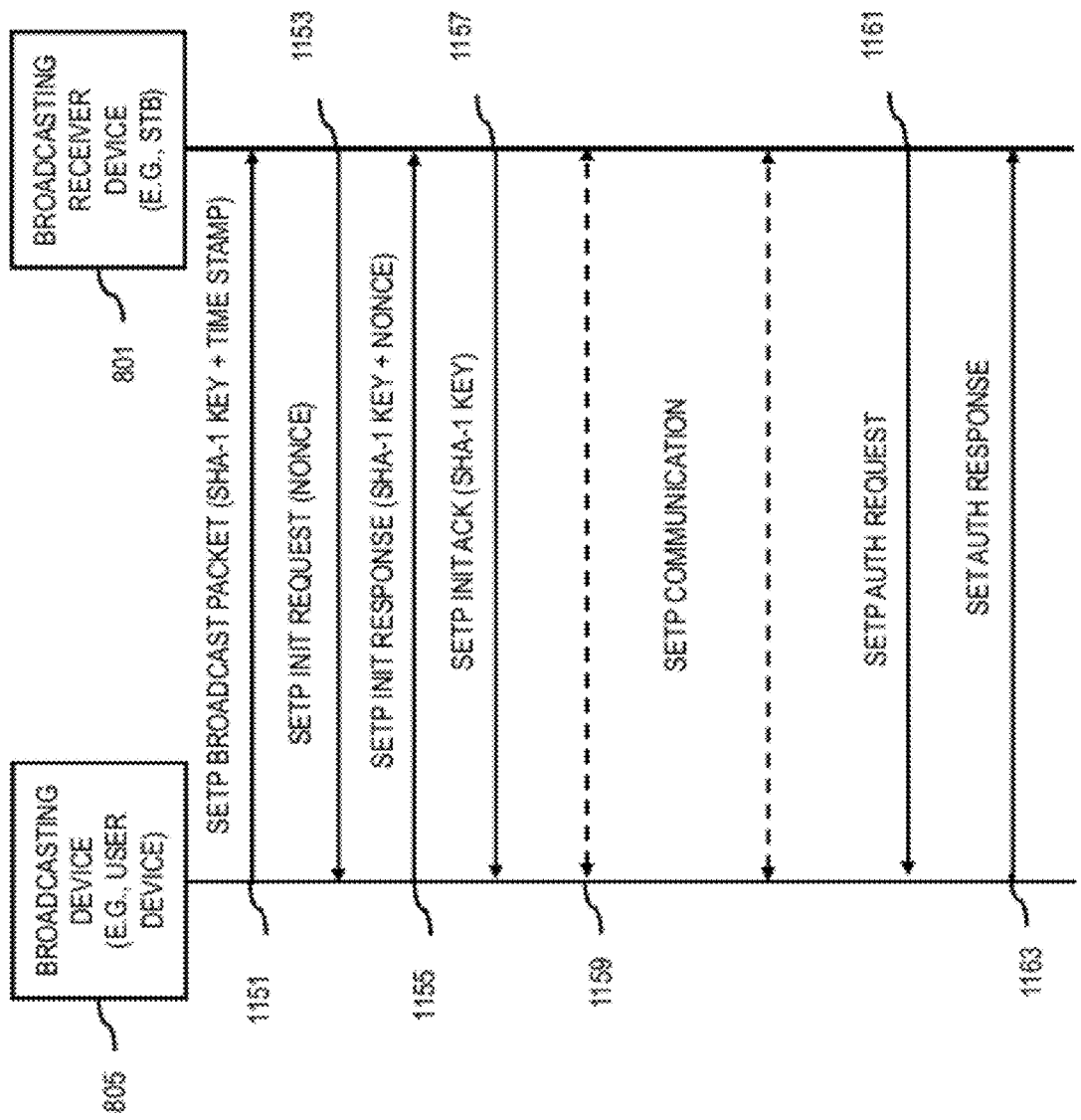

METHOD AND APPARATUS FOR INTERACTING WITH A SET-TOP BOX BASED ON SENSOR EVENTS FROM A USER DEVICE

BACKGROUND INFORMATION

With the convergence of telecommunications and media services, there is increased competition among service providers to offer more services and features to consumers, and concomitantly develop new revenue sources. For instance, traditional telecommunication companies are entering the arena of media services that have been within the exclusive domain of cable (or satellite) television service providers. Television remains the prevalent global medium for entertainment and information. Concurrently, media services have enjoyed great success in other industries, such as portable media devices (e.g., personal digital assistants (PDAs), MP3 players, mobile phones, etc.), audio streaming services, video streaming, etc. Unfortunately, little or no attention has been paid to the integration of the various mediums to support the seamless sharing and experience of media. Traditionally, television service providers have offered limited user interaction with set-top boxes, other than through a conventional infrared remote controller to control selection of programs. Moreover, users can be engaged in other activities, such as voice communications, etc., or have access to other services during their viewing experiences. However, there has been little or no coordination of the devices that permit participation in these other activities with the set-top boxes. That is, integration of these services have been lacking.

Therefore, there is a need for an approach to provide coordination between media experience over a set-top box and other telecommunications and media services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 10A and 10B are diagrams of a communication protocol and associated messaging formats for controlling STB applications based on sensor events, according to various embodiments;

FIGS. 11A-11C are flowcharts of processes for establishing communication between a user device and a set-top box, according to various embodiments;

DESCRIPTION OF THE PREFERRED EMBODIMENT

A preferred apparatus, method, and system for controlling a set-top box based on sensor events from a user device are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE). Furthermore, although the STB is explained in the context of call events, it is contemplated that other device events relating to various services and functions are applicable.

Figure 1:
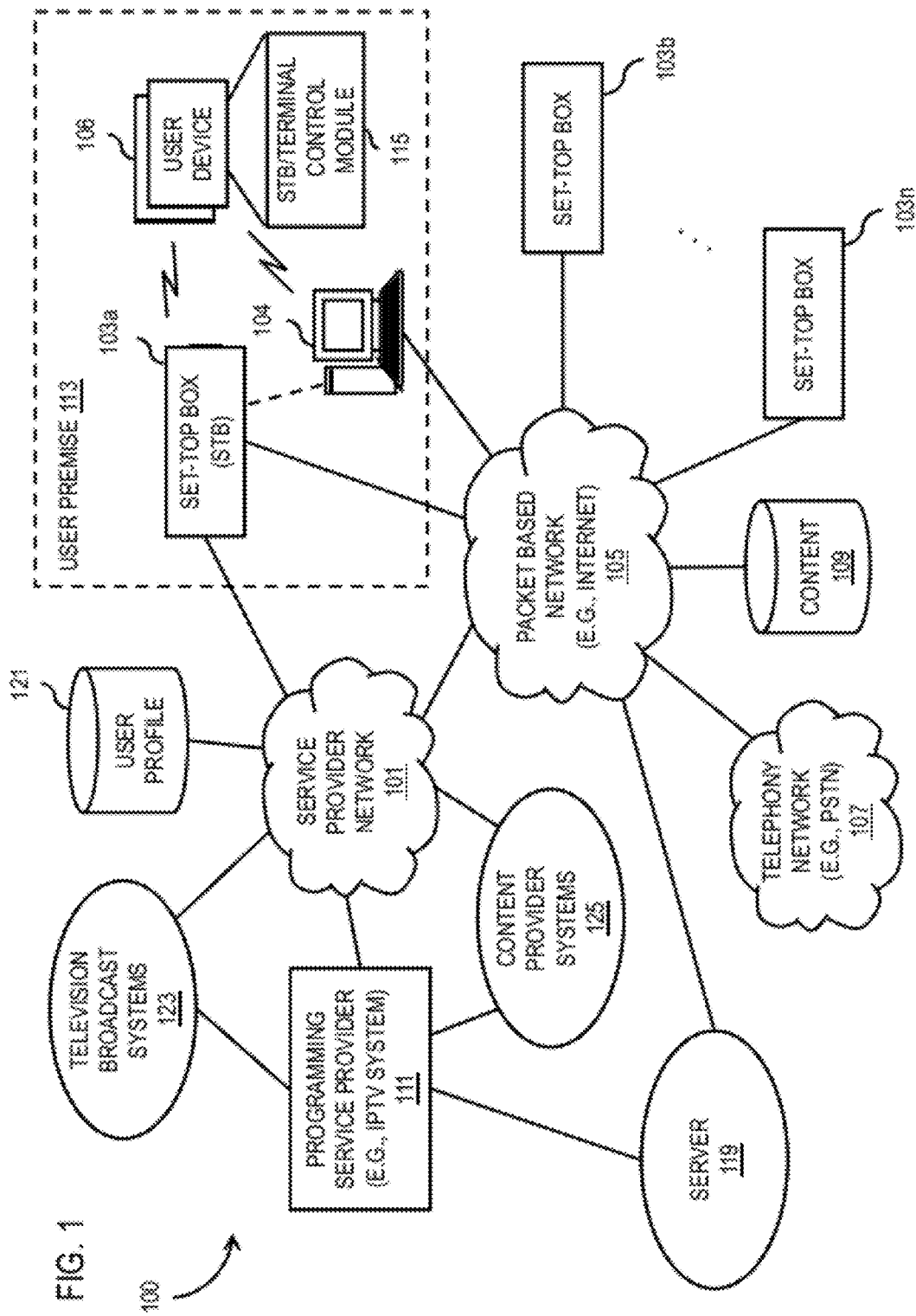
FIG. 1 is a diagram of a system capable of interacting with a set-top box (STB) based on sensor information from a user device, according to an exemplary embodiment.

FIG. 1 is a diagram of a system capable of interacting with a set-top box (STB) based on sensor information from a user device, according to an exemplary embodiment. It is observed that even with the advent of the Internet and high-speed data connections, television remains the prevalent global medium for entertainment and information. In fact, as traditional television programming (e.g., "over-the-air" programming, cable programming, satellite programming, etc.) merges with the online content (e.g., network-streamed content, on-demand content, Internet programming, media-sharing websites, etc.), the available programming choices are likely to continue to grow without any true bounds. It is also recognized that the versatility of user devices, such as mobile phones equipped with cameras and audio/video players, have resulted in users becoming a prolific source or generator of media. However, no such media convergence is available for user devices, which may contain media that the user has created, purchased, or otherwise accumulated. Such problem stems, in part, from the lack of connectivity between the user devices and set-top boxes. Moreover, there has not been any development regarding the protocol mechanisms to facilitate the convenient and efficient transfer of data. With respect to user devices, such as mobile communication devices (particularly those that support both cellular and wireless networking interfaces), these devices are continually available to support voice communications. As mentioned, no coordination between these devices and set-top boxes exists, and thereby imposing the inconvenience to users of having to manually manipulate the set-top box, for instance, to reduce the volume to properly engage in the voice call.

To address this problem, the system 100 of FIG. 1 enables the control of a set-top box by a user device based on device actions or events relating to sensor information. In one embodiment, the user device, e.g., mobile phone, can instruct the set-top box, in response to a device action that is based on one or more sensors corresponding to the user device. Device events pertain to independent processes and activities of the subject device; that is, the processes are independent of the functions and outputs of the set-top box. Device events, for instance, can comprise actions or activities associated with interactive media, such as audio applications, video applications, gaming applications, etc. By way of example, sensor-based device events (or sensor events) refer to events that stem from or reflect a change in one or more sensors. In certain embodiments, sensors can include either a gyroscope, accelerometer, light sensor, proximity sensor, temperature sensor, pressure sensor, or magnetic sensor. Effectively, the user device can assume the functions of a remote control device or an application (e.g., game) controller for the set-top box.

In certain embodiments, the user device may be any type of computer device or mobile device having the capability to support voice communications via software, firmware, and/or hardware. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

In the example of FIG. 1, service provider network 101 integrates the television medium with that of the telecommunications, computing, and media environments, thereby broadening the scope of devices and sources available to individuals for obtaining programming content or other media. By way of example, service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form.

STBs 103*a*-103*n* and/or terminal 104 can communicate using the packet-based network 105 and/or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 103*a*-103*n* to various sources of media content. Although depicted in FIG. 1 as separate networks, packet-based network 105 and/or telephony network 107 may be completely or partially contained within service provider network 101. For example, service provider network 101 may include facilities to provide for transport of packet-based and/or telephony communications.

As discussed previously, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 125, content residing in a repository 109 or accessible via server 119, as well as available via one or more packet-based networks 105 or telephony networks 107, etc.

Figure 8:
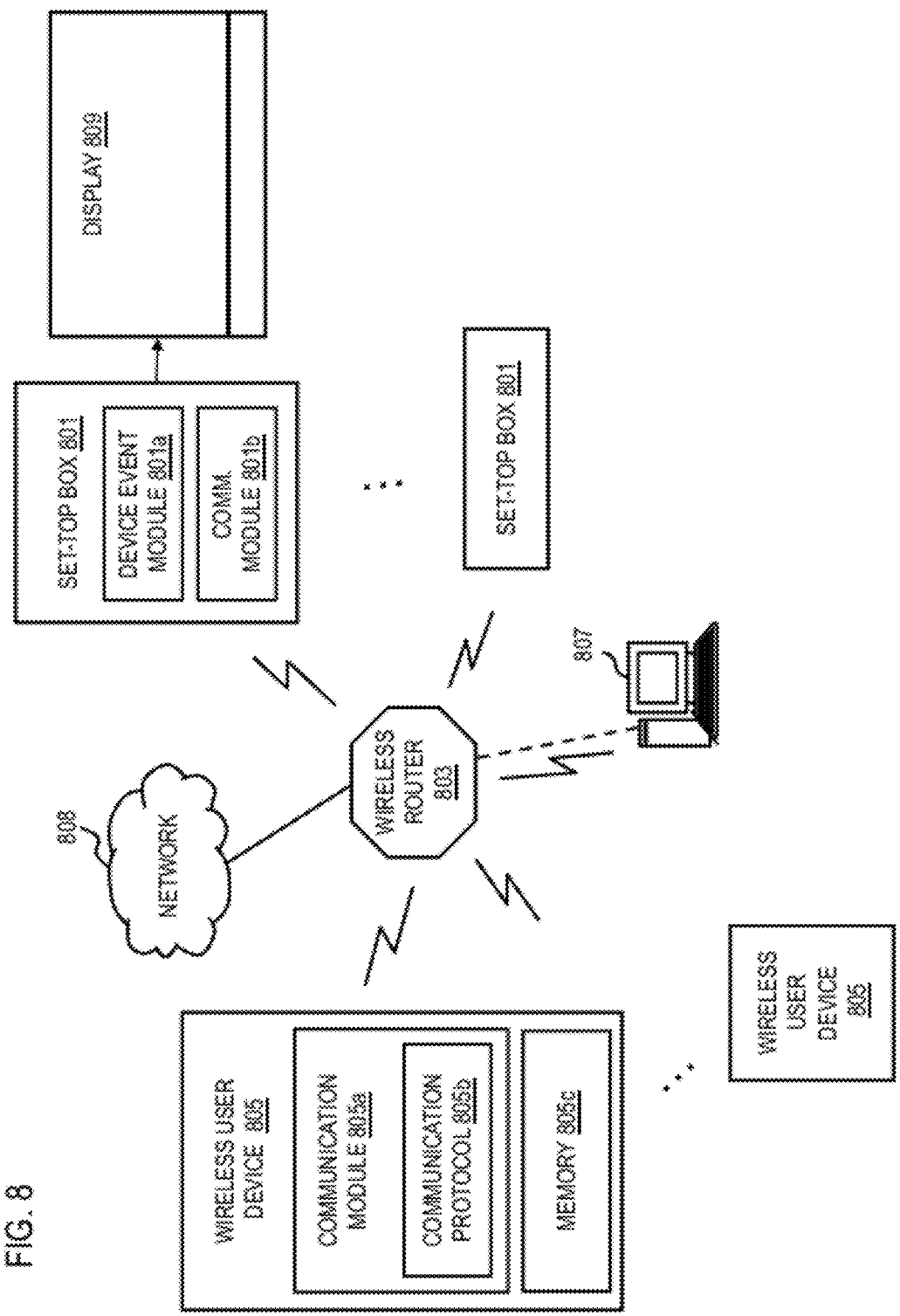
FIG. 8 is a diagram of a wireless environment in which user devices and set-top boxes interact to provide control of the set-top boxes based on sensor information of the user devices, according to an exemplary embodiment.

STBs 103*a*-103*n* may be used alone or in combination with one or more end terminal(s) 104 to implement various exemplary embodiments relating to receiving commands that are call event driven from one or more user devices 106. Under the scenario of FIG. 1, user premise 113 includes these user devices 106 and terminal 104. As shown, user device 106 possesses a STB/Terminal control module 115, which is configured to translate sensor events into control signals or messages for set-top box 103*a* as well as terminal 104 to execute. According to one embodiment, either one or both of the STB 103*a* or the terminal 104 can behave as a gaming console, whereby user device 106, such as mobile phone, can conveniently be employed as a game controller. Also, it is contemplated that user premise 113 can house multiple STBs (as shown in FIG. 8).

As will be more fully described later, set-top box 103*a* can wirelessly (e.g., using Wi-Fi) detect presence of terminal 104 (assuming terminal is so configured to communicate wirelessly) and user device 106 in response to a broadcast message. Thereafter, set-top box 103*a* can receive instructions or commands from user device 106, as more fully described below with respect to FIGS. 2-6, and 9.

By way of example, STB 103*a*-103*n* can remotely access one or more servers (e.g., server 119), via a communication interface (not illustrated), configured to execute one or more applications in support of the sensor event-based controls. In one embodiment, the event translation process can be executed by user device 106 solely or in conjunction with STB 103. Alternatively, this translation process can be performed by the STB 103; in which case, information about the sensor event can be transmitted to the STB 103 with little or no processing by the user device 106. The sensor event application interacts with user device 106 to interpret the control signals emanating from user device 106. Under this arrangement, the sensor event application may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 119 can be an "online" system capable of communicating with one or more third-party web servers (not illustrated), content repositories (e.g., repository 109), or equivalent facilities, to provide users various avenues to locate, specify, receive, and/or share programming content that is accessible over a data network (e.g., packet-based network 105). For example, exemplary embodiments of media slideshow application may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into programming service provider 111.

In the example of FIG. 1, STBs 103a-103n are located at one or more user premises (e.g., user premise 113), and geospatially associated with one or more regions. STBs 103a-103n may be configured to communicate with and receive signals and/or data streams from a programming service provider 111 (or other transmission facility). These signals include results of applying search or browse operations on the available programming content (e.g., video assets) and related date (e.g., programming guide data, metadata) retrieved over a data network (e.g., service provider network 101, packet-based network 105, and/or telephony network 107), as well as conventional video broadcast content.

In one embodiment, a user profile repository 121 may be employed to maintain subscribers to the device event-based STB control service. User profile repository 121 along with content repository 109, or server 119 may be accessed via one or more service provider networks 101 and/or packet-based networks 105. In one embodiment, the user profile repository 121 stores user settings, preferences, and configuration information for the service. Further, service provider network 101 may include a system administrator (not shown) for operational and management functions to deploy the virtual channel service using, for instance, an internet protocol television (IPTV) system. In this manner, STBs 103a-103n can utilize any suitable technology to draw, receive, and/or transmit media content from/to a programming service provider 111 or other content source/sink. A more detailed explanation of an exemplary STB is provided with respect to FIG. 7.

In an exemplary embodiment, STBs 103a-103n can draw, receive, and/or transmit programming guide information and related content from (or to) multiple sources, thereby alleviating the burden on any single source, e.g., programming service provider 111, to gather, supply, or otherwise meet the content demands of any user or premise. Thus, particular embodiments enable authenticated third-party television broadcast systems 123, third-party content provider systems 125, and servers (e.g., server 119) to transmit programming content accessible over a data network to STBs 103a-103n either apart from, or in conjunction with, programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, service provider network 101 may include one or more video and/or audio processing modules (not shown) for acquiring and transmitting programming guide information and related content feeds (including content accessible over a data network) from programming service provider 111, the television broadcast systems 123, the third-party content provider systems 125, or servers 119 over one or more of the networks 101, 105, 107, to particular STBs 103a-103n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Moreover, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB or content source is authenticated, connections between the STBs 103a-103n and the content sources may be established directly or through the programming service provider 111.

In other embodiments, authentication procedures on a first device (e.g., STB 103a) may identify and authenticate a second device (e.g., terminal 104) communicatively coupled to, or associated with, the first device. Further, the authentication module may grant users the right to receive programming guide information and related content from multiple system 100 sources by revoking existing sets of digital certificates associated with a particular provider, and issuing new sets of digital certificates mapped to a second provider. In this regard, an STB (e.g., STB 103a) may receive new programming content or guide information from a second source, whereas the previous session may be automatically closed when the "old" or prior certificates associated with the first source are revoked. This enables users to initiate secure sessions at any given STB 103a-103n (or end terminal 104) linked to system 100, whether or not the STB (or end terminal) belongs to that individual user. It is additionally contemplated that multiple rights sessions may exist concurrently.

In particular embodiments, programming service provider 111 may comprise an IPTV system configured to support the transmission of television video programs from the broadcast systems 123 as well as other content, such as content from the various third-party sources (e.g., 109, 119, 123, 125) utilizing internet protocol (IP). That is, the IPTV system 111 may deliver programming guide information, signals and/or streams, including programming content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 103a) may integrate all the functions of an IPTV system, as well as combine the programming content and video asset management functions of the various online or off-line environments. For example, it is contemplated that the personalized programming guide service may be extended to users with a presence on the Internet. In alternative embodiments, the services of system 100 could be extended to users having an end terminal (not shown), such as a plain old telephone service (POTS) device, connected to the telephony network 107. While system 100 is illustrated in FIG. 1, the exemplary components are not intended to be limiting, and indeed, additional or alternative components and/or implementations may be utilized.

Although the user equipment is described with respect to an STB 103, it is contemplated that various embodiments have applicability to any device capable of processing video, audio, and/or multimedia streams.

Figure 2A:
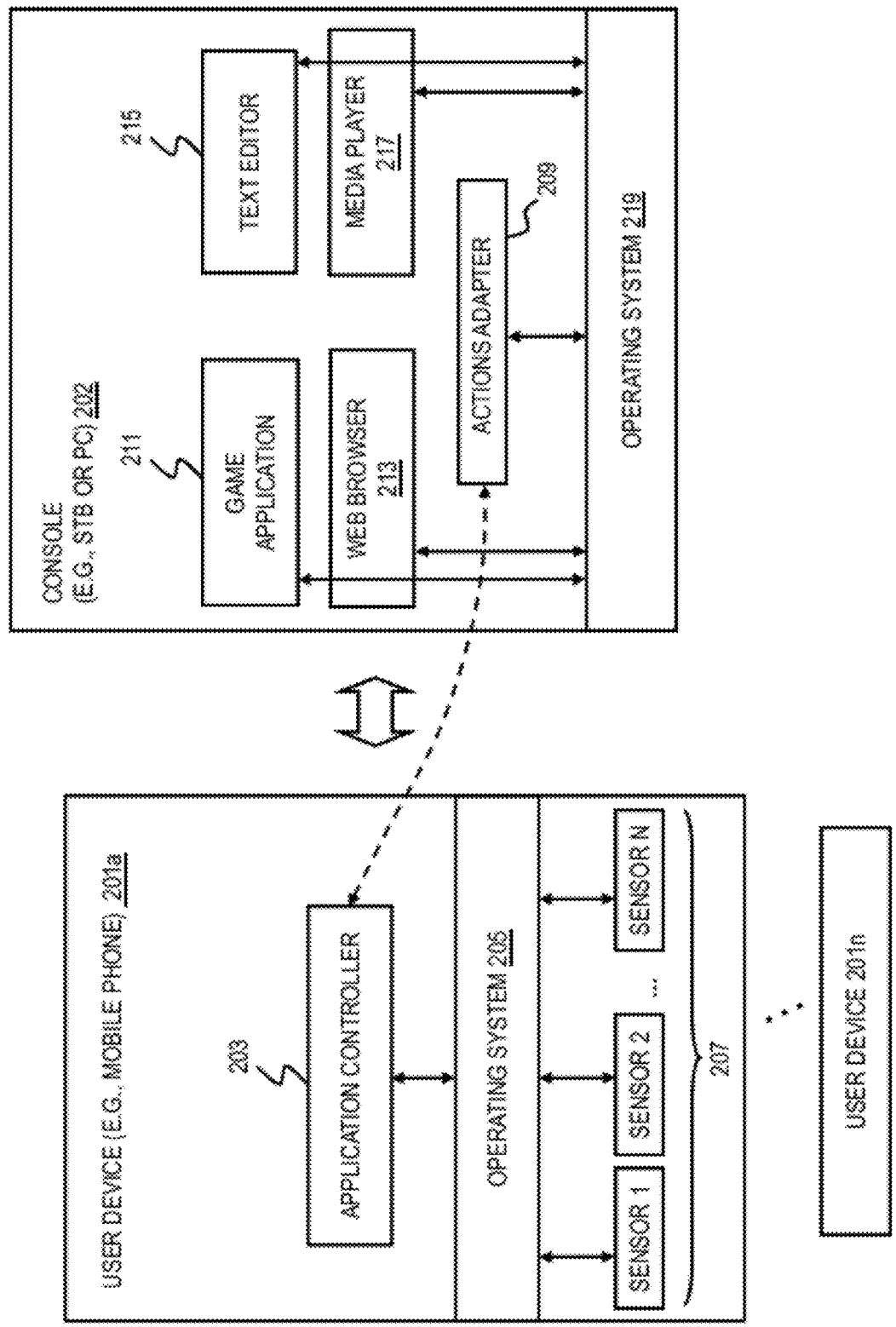
FIGS. 2A and 2B are, respectively, a diagram of a user device controlling a STB or computing terminal using sensor information, and a ladder diagram showing delivery of the sensor information according to a generic event delivery protocol (GEDP), according to various embodiments.

FIG. 2A is a diagram of a user device controlling a STB or computing terminal using sensor information, according to an exemplary embodiment. Under this scenario, user device 201, which can be a mobile phone, can serve as a controller for console 202. The console 202, in certain embodiments, is a gaming console and can be implemented by STB 103a or terminal 104. In one embodiment, mobile phone 201 possesses wireless communication interfaces, such as a cellular interface as well as a Wi-Fi interface (not shown). In this example, mobile phone 201 includes an application controller 203 that interfaces with an operating system 205 to generate sensor events. Sensor information is collected from one or more sensors 207; in certain embodiments, these sensors 207 can include a gyroscope, accelerometer, light sensor, proximity sensor, temperature sensor, pressure sensor, or magnetic sensor. Depending on the application, any combination of these sensors 207 can be implemented. Although shown within the mobile phone 201, one or more of the sensors 207 can be external to the phone 201 and coupled as a peripheral device.

Application controller 203 can capture user input and translates such input to a format that can be interpreted by one or more applications on STB 103a. For example, the mechanism for receiving user input can be a keypad click or a simple touch or a click or a gesture or combination of all these actions. Also, responses from sensors 207 (e.g., accelerometer, gyroscope, pressure sensor, and other available mobile phone sensors) can be used as user input or supplement the user input. As seen, sensor events originating from application controller 203 is transmitted to an actions (or events) adapter 209 of STB 103a. These sensor events are processed by adapter 209, which communicates with various applications 211-217 via operating system 219. In some embodiments, STB 103a provides a game application 211, a browser application (for navigating the World Wide Web) 213, a text editor 215, and a media player 217. In the case of the STB 103a executing the game application 211, mobile phone 201 can utilize the sensors 207 to facilitate the generation of game responses. For example, the mobile phone 201 can utilize an accelerometer, as one of the sensors 207, to capture values indicative of the speed of a character or avatar within the game application 211. The communication between user device 201 and console 202, according to one embodiment, is governed by a Generic Event Delivery Protocol(GEDP), as next explained.

Figure 2B:
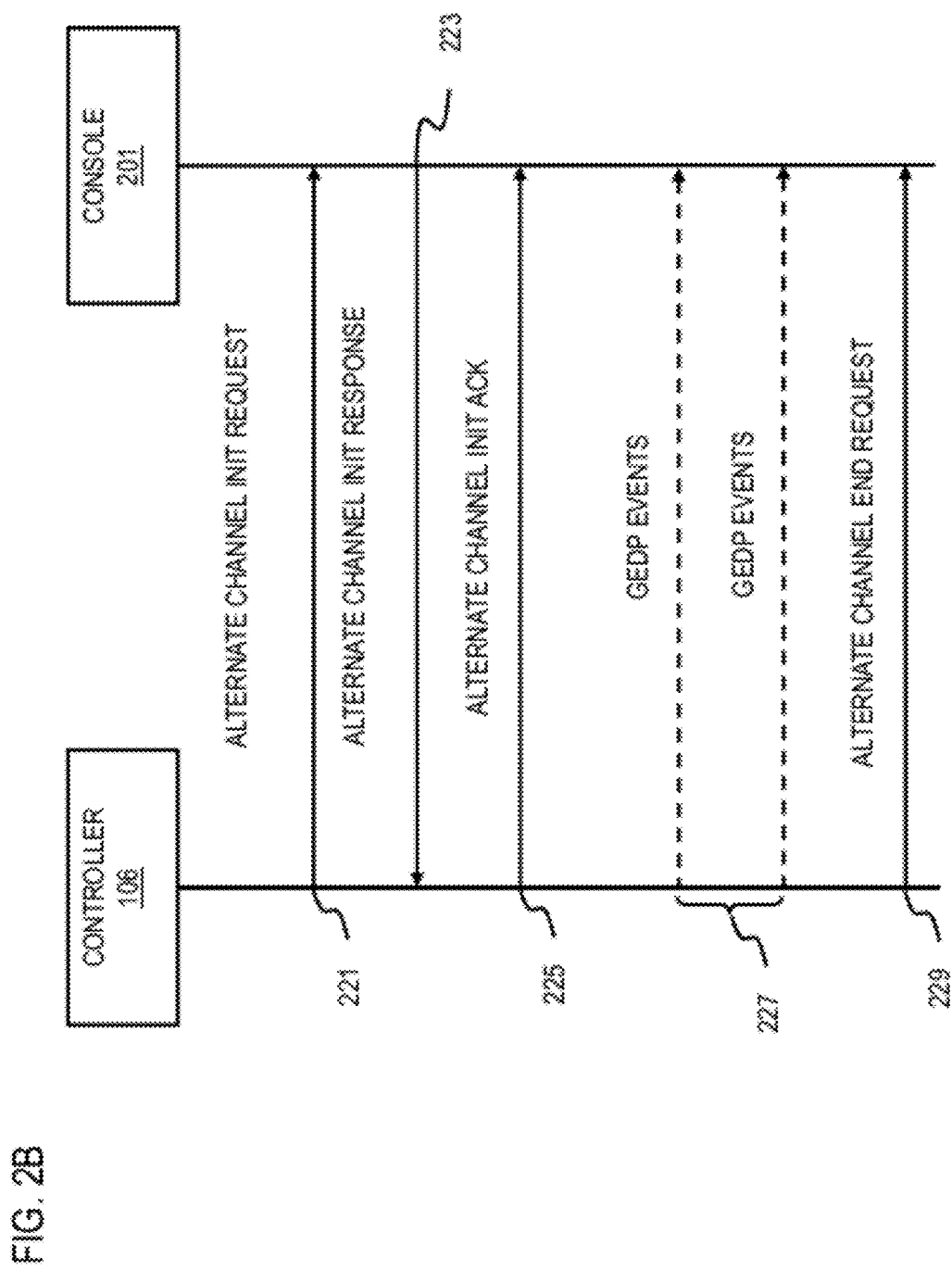

FIG. 2B is a ladder diagram showing delivery of the sensor information according to a generic event delivery protocol (GEDP), according to an exemplary embodiment. Continuing with the example of FIG. 2A, user device 201 (specifically application controller 203) exchange messages with console 202 to convey sensor events. That is, console 202 receives and processes events and actions from the controller 201. Accordingly, controller 201 provides the inputs to the console 202; moreover, controller can produce any kind of events based on the user action. In particular, events that are generated stemming from or in conjunction with one or more sensors 207 are referred to as sensor events—e.g., gyro events, accelerometer events, proximity events, light event, temperature events, magnetic field events, or touch events. Additionally, other events from the device's input mechanisms, e.g., keyboard events, can be utilized solely or in conjunction with the sensor events. By way of example, the Generic Event Delivery Protocol (GEDP) can be used to efficiently and rapidly deliver the game related events. These events can be used to control console 202, which behaves as a gaming console, in response to the events and actions generated by user device 201. This protocol also ensures the processing time is minimal as the headers are predefined, and that the protocol has the flexibility to accommodate a host of events with minimum header size.

Under this scenario, user device 201 (or controller) can act as a Simple and Extensible Transmission Protocol (SETP) endpoint device; SETP is a binary protocol that is used as the controller of the event delivery protocol. SETP with the minimal functionality can be used as the controlling channel for GEDP. In certain embodiments, GEDP supports data delivery across the controller devices and the consoles. The initial detection, handshaking and authorization are also handled by the SETP. However the requirement of the SETP as controlling protocol need only be optional. SETP is more fully described below with respect to FIGS. 10 and 11. Console 202 In certain embodiments, this protocol can operate with the Transmission Control Protocol (TCP) and User Datagram Protocol (UDP).

For the purposes of explanation, GEDP is described for the delivery of the following events: gyro events, accelerometer events, proximity events, light event, temperature events, magnetic field events, touch events, and keyboard (or cursor control) events. It is contemplated, however, that other events can be defined by specifying the event related information for the generic value header.

As seen in FIG. 2B, the delivery of sensor events from controller 201 to console 202 begins with detection of the controller 201 by console 202 followed by a handshake between these devices. Regarding device detection, SETP is employed to detect GEDP devices (e.g., controller 201). GEDP devices can be detected by examining the SETP header. The handshaking for the GEDP, according to one embodiment, is performed by using a SETP alternate channel command. In step 221, controller 201 generates an alternate channel initiation request to establish communication with console 202 over a SETP alternate channel. Console 202, in turn, produces a response to the request, as in step 223, for transmission to controller 201, which provides an acknowledgement message indicating receipt of the response (step 225). Next, sensor events are forwarded to console 202 by controller 201, per step 227. Thereafter, the channel can be terminated by an alternate channel end request submitted by the controller 201 to console 202, as in step 229.

The above process involves the exchange of GEDP packets. In some embodiments, GEDP packet are 20 bytes in length, whereby the GEDP header is used to carry all the event information and data. The structure of the GETP header, in one embodiment, is given below in Table 1.

TABLE 1

| Field | Length |
| --- | --- |
| Protocol Id | 1 Unsigned Byte |
| Protocol Version | 1 Unsigned Byte |
| Sensor Id | 1 Unsigned Byte |
| Console Id | 1 Unsigned Byte |
| Control Id | 1 Unsigned Byte |
| Flag | 1 Unsigned Byte |
| Reserved | 2 Unsigned Byte |
| Generic Data | 12 Unsigned Bytes |

The Protocol Id field is used to identify a packet. The Protocol Version field denotes the major version of the protocol. The Sensor Id field denotes the Sensor Id information of the GEDP packet, and can be defined according to Table 2:

TABLE 2

| Sensor Id | Sensor Type |
| --- | --- |
| 0 | Reserved |
| 1 | Reserved |
| 2 | Gyro control |
| 3 | Accelerometer |
| 4 | Keyboard |
| 5 | Touch |
| 6 | Proximity |
| 7 | Light |
| 8 | Temperature |
| 9 | Magnetic |
| 10 | Mouse |
| 11 | Information from Console |

The Console Id field specifies a unique value for the console, and the Control Id field provides an optional value relating to identification of the controller 201. The flags are reserved fields, which can be specified according to the particular application. Additionally, Reserved fields are provided for future developments. A Generic Data field specifies, in one embodiment, the input details from the user for different events; hence this field is interpreted based on the Sensor Id.

Table 3 illustrates the user input data associated with Generic Data field, which can be an eight byte header field.

TABLE 3

| Data Type | Size |
| --- | --- |
| Byte | 1 Byte |
| Integer | 2 Bytes |
| Long Integer | 4 Bytes |
| Float | 4 Bytes |

By way of example, GEDP provides the following input methods: gyro control, acceleration control, keyboard control, touch control, proximity control, light control, temperature control, magnetic control, and mouse control. Regarding the gyro control method, this method can take three consecutive float values that represent the measurements of x axis, y axis, and z axis, as shown in Table 4. If any of the values are not applicable, a zero value is used.

TABLE 4

| Index of Generic Value | Data Type | Description |
| --- | --- | --- |
| 1-4 | Float | X axis |
| 5-8 | Float | Y axis |
| 9-12 | Float | Z axis |

For the acceleration control method, three consecutive float values (representing the movement intensity in x axis, y axis and z axis) are utilized. If any of the values are not applicable, the value is set to zero, according to one embodiment. Table 5, which represents the values, resembles that of Table 4.

TABLE 5

| Index of Generic Value | Data Type | Description |
| --- | --- | --- |
| 1-4 | Float | X axis |
| 5-8 | Float | Y axis |
| 9-12 | Float | Z axis |

The keyboard control method uses the first two bytes of the generic data to send the details of the key that was pressed (or otherwise activated). The data is represented in byte data type of GEDP, wherein the first byte represents the key value and the second byte represents the state (shown in Table 6).

TABLE 6

| Index of Generic Value | Data Type | Description |
| --- | --- | --- |
| 1 | Byte | Key value |
| 2 | Byte | State |
| 3-6 | Long Integer | Time stamp (optional) |

Table 7 lists the states and their corresponding values;

TABLE 7

| State | Description |
| --- | --- |
| Key Pressed | 1 |
| Key Released | 2 |

Table 8 lists the values for the touch control method:

TABLE 8

| Index of Generic Value | Data Type | Description |
| --- | --- | --- |
| 1 | Byte | No of fingers |
| 2 | Byte | State Id |

The proximity control method takes the one byte of data to represent the percentage of distance between the device and the obstacle. Table 9 enumerates the values for this method.

TABLE 9

| Index of Generic Value | Data Type | Description |
| --- | --- | --- |
| 1-4 | Float | Percentage of distance between the device and the obstacle |
| 5-8 | Float | The lower limit |
| 9-12 | Float | The upper limit |

Table 10 shows the values for the light control method:

TABLE 10

| Index of Generic Value | Data Type | Description |
| --- | --- | --- |
| 1-4 | Float | Intensity of light |
| 5-8 | Long Int | Time stamp |

Table 11 shows the values for the light control method:

TABLE 11

| Index of Generic Value | Data Type | Description |
| --- | --- | --- |
| 1-4 | Float | Temperature |

Table 12 provides the values for the magnetic control method; such values relates to the intensity of the magnetic field in x axis, y axis and z axis.

TABLE 12

| Index of Generic Value | Data Type | Description |
| --- | --- | --- |
| 1-4 | Float | X axis |
| 5-8 | Float | Y axis |
| 9-12 | Float | Z axis |

Regarding the mouse control, Table 13 provides the values.

TABLE 13

| Index of Generic Value | Data Type | Description |
| --- | --- | --- |
| 1-2 | Integer | X value |
| 3-4 | Integer | Y value |
| 5 | Byte | Click Type (1 - single click, 2 - double click) |
| 6 | Byte | Button (1 - Left, 2 - Right, 3 - Scroll) |

Figure 3:
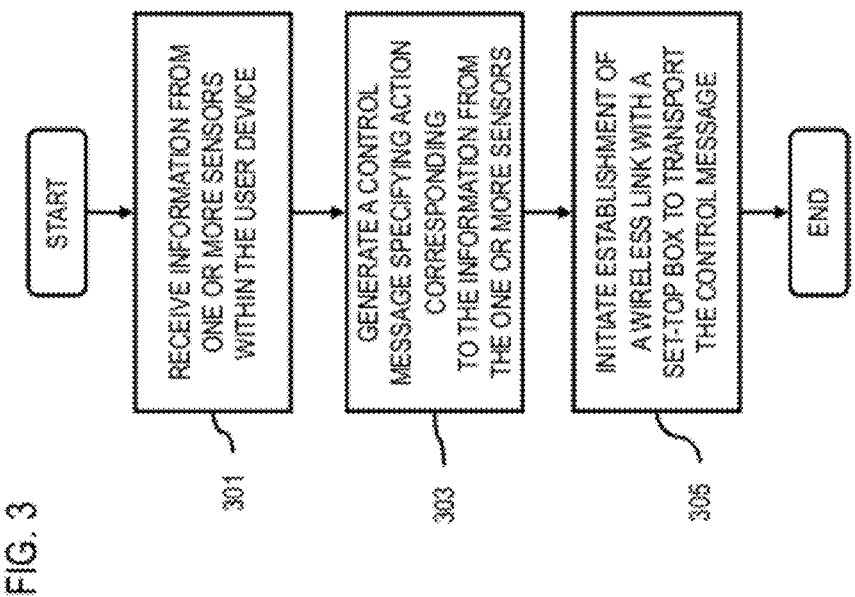
FIG. 3 is a flowchart of a process for acquiring sensor information for use in controlling a STB, according to an exemplary embodiment.

FIG. 3 is a flowchart of a process for acquiring sensor information for use in controlling a STB, according to an exemplary embodiment. By way of example, this process is described with respect to the system of FIG. 2, whereby the console 202 is a set-top box. In step 301, user device 201 receives information from one or more sensors 207, and generates a control message specifying an action (e.g., sensor event) based on the received information (step 303). Next, in step 305, user device 201 initiates establishment of a wireless link with STB 202 to transport the control message, which includes the sensor event to be interpreted by STB 202.

Figure 4:
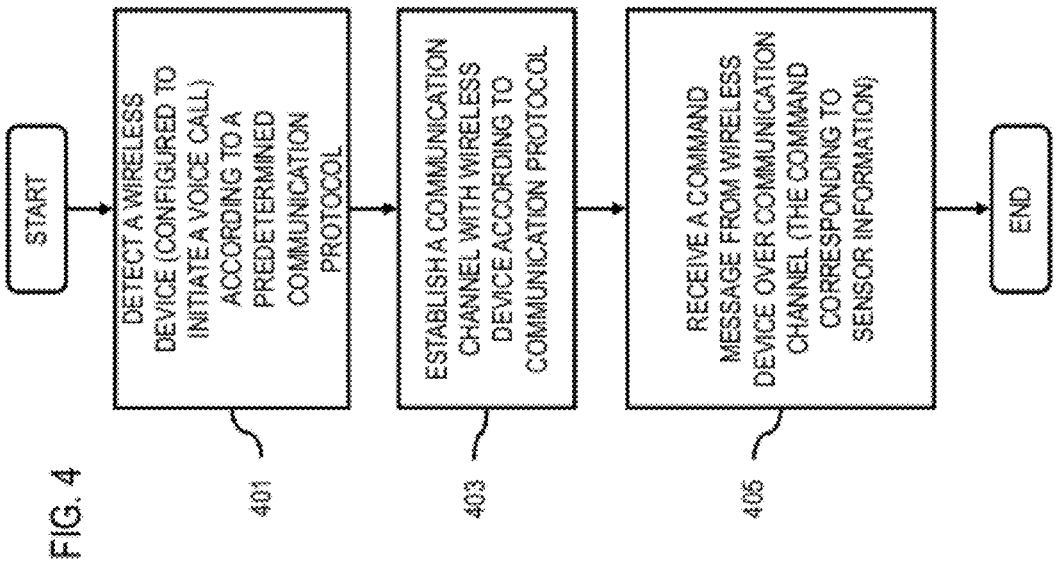
FIG. 4 is a flowchart of a process for executing a command for controlling a set-top box in response to sensor information, according to an exemplary embodiment.

To permit the transport of sensor events to the STB 202, STB 202 first detects presence of user device 201, as explained with respect to FIG. 4.

FIG. 4 is a flowchart of a process for executing a command for controlling a set-top box in response to sensor information, according to an exemplary embodiment. Continuing with the example of FIG. 2, set-top box 201, per step 401, detects user device 201 according to a predetermined communication protocol (e.g., SETP). SETP provides device detection and bonding as well as handling of command messages and data messages. Advantageously, the protocol is designed to be simple, as to accommodate the constraints associated with portable (or mobile) devices; such devices are typically constrained by battery life and processing power.

In this scenario, user device 201 is a mobile phone with local wireless communications capability (e.g., WiFi) as well as a cellular interface. Alternatively, user device 201 can be any wireless device configured to initiate or process a voice call—e.g., a laptop computer equipped with a softphone to process voice over IP (VoIP) calls.

In step 403, STB 202 establishes a communication channel with user device 201 using the communication protocol. Details of the establishment of the communication channel is provided with respect to FIGS. 11A-11C. Next, set-top box 103a receives a command message, as in step 405, from user device 201 over the established channel. The command, for instance, can be generated based on a device event (e.g., sensor event) by user device 201.

As earlier described, sensor events may be interpreted as actions or events within the application within, as next explained.

Figure 5:
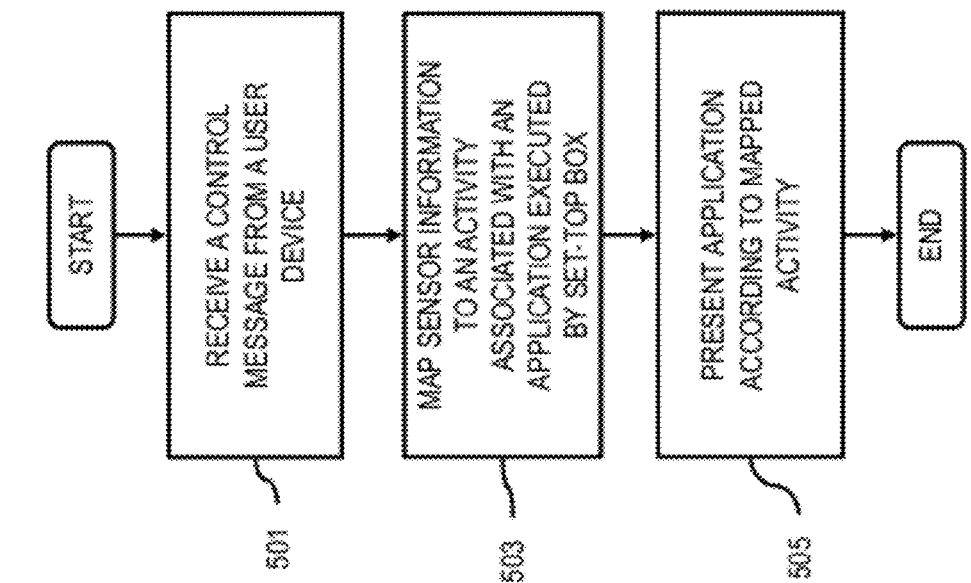
FIG. 5 is a flowchart of a process for mapping sensor information to control an application of a STB, according to an exemplary embodiment.

FIG. 5 is a flowchart of a process for mapping sensor information to control an application of a STB, according to an exemplary embodiment. Upon receiving a control message (which specifies a sensor event) from user device 201, as in step 501, an application, such as game application 211, that is being executed by STB 202. For instance, assuming the game application 211 involves moving an character or object, the device 201 (e.g., mobile phone) can act as a game controller whereby sensor information from a gyroscope or accelerometer (i.e., sensors 207) can be translated into movement controls for the character or object. In this manner, the mobile phone 201 provides greater flexibility in control mechanisms, other than traditional cursor controls or keyboard inputs, which could be cumbersome on a mobile phone (given its small form factor). However, it is contemplated that such traditional input controls can be used in conjunction with the sensors 207.

In step 503, the sensor event is mapped to an activity associated with the application 211, such that the sensor event results in presentation, per step 505, of the character or object reflective of the actions detected by the sensors 207 of the mobile phone 201.

Further to the above process, console 202 can support the use and concurrent operation of multiple user devices 201a-201n as controllers.

Figure 6:
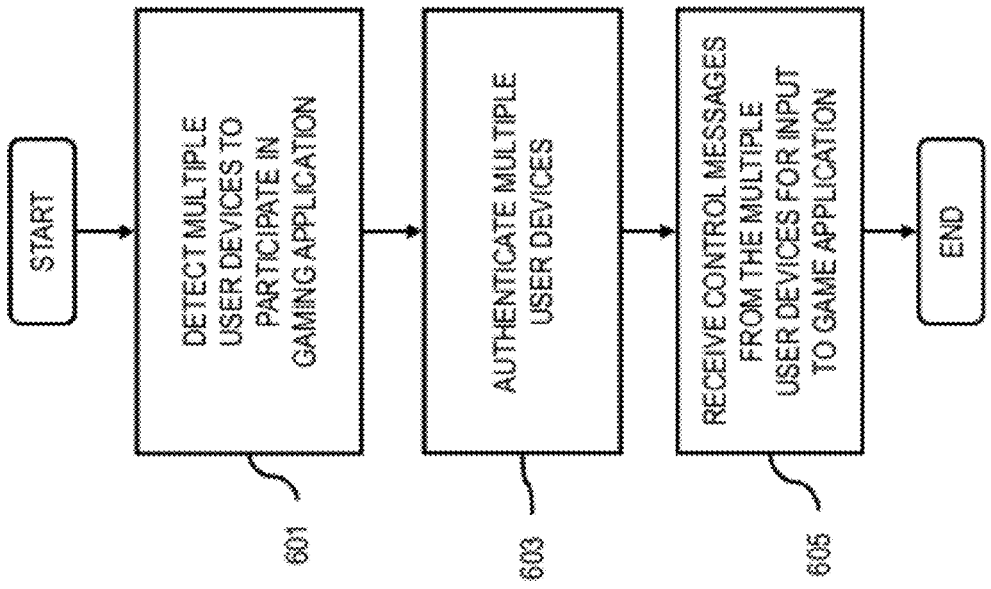
FIG. 6 is a flowchart of a process for registering multiple user devices to share an application of a STB, according to an exemplary embodiment.

FIG. 6 is a flowchart of a process for registering multiple user devices to share an application of a STB, according to an exemplary embodiment. Under this scenario, multiple user devices 201a-201n are detected by console 202 for participation in an application (e.g., game application 211), per step 601. Console 202 then authenticates the multiple user devices 201a-201n, as in step 603. Subsequently, user devices 201a-

201n can generate control messages based on sensor events for transmission to console 202. In step 605, these control messages are received and interpreted for input to the game application 211.

Figure 7:
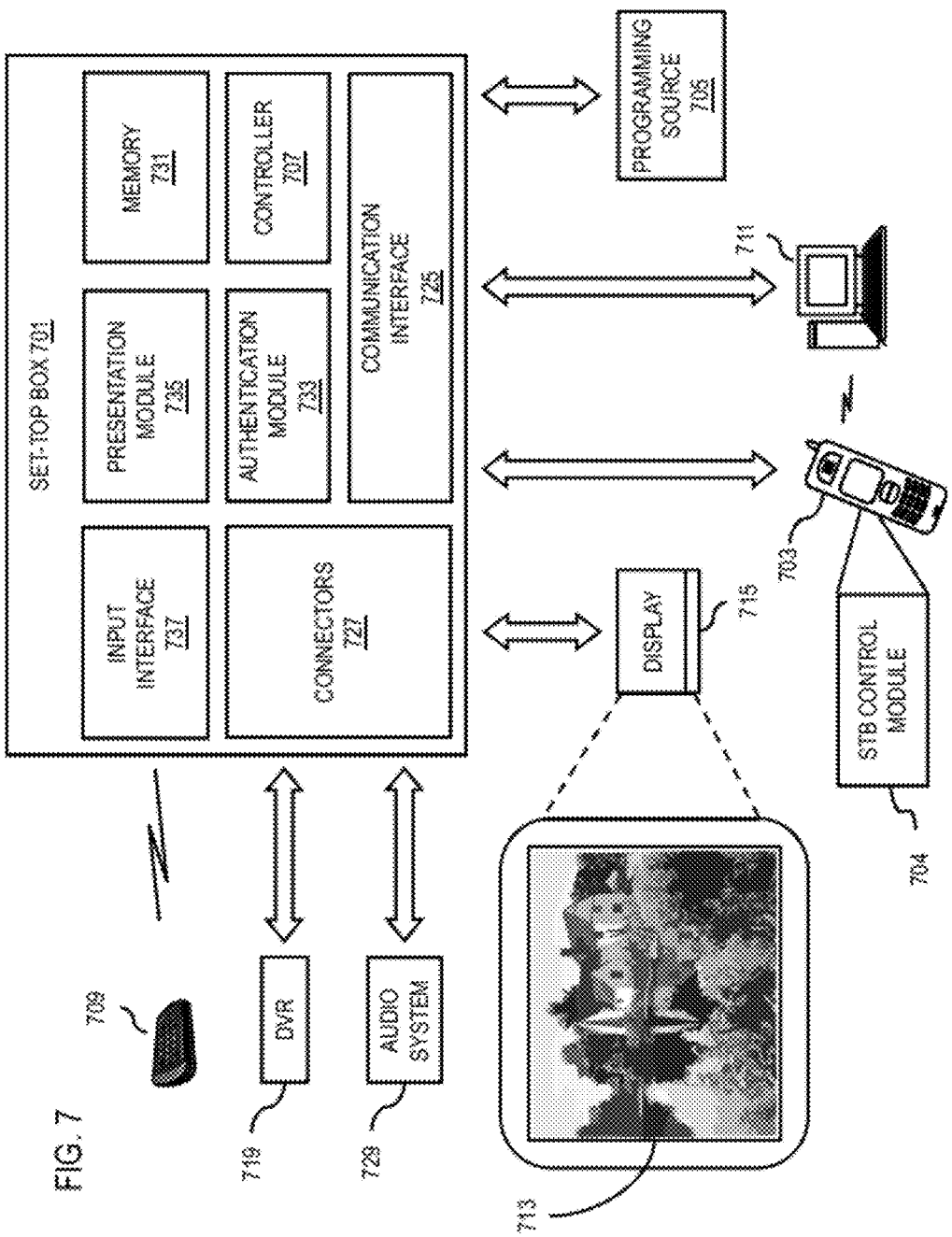
FIG. 7 is a diagram of a set-top box configured to be controlled based on sensor information from a user device, according to an exemplary embodiment.

FIG. 7 is a diagram of a set-top box configured to be controlled based on sensor information from a user device, according to an exemplary embodiment. STB 701 may utilize any suitable technology to receive media from user device 703 (e.g., mobile phone), as well as one or more content streams from a programming source 705, such as the IPTV system of FIG. 1. In this example, user device 703 includes an STB control module 704 to generate and forward sensor events to STB 701. STB control module 704 communicates with various sensors (e.g., a gyroscope, accelerometer, light sensor, proximity sensor, temperature sensor, pressure sensor, or magnetic sensor) of user device 703.

STB 701 may comprise computing hardware (such as described with respect to FIG. 12) and include additional components configured to provide services related to processing call event driven. In addition, STB 701 includes hardware and/or other components to support related functions and capabilities for viewing video assets (e.g., remote control capabilities, conditional access functions, tuning functions, presentation functions, multiple network interfaces, audio/video signal ports, etc.). As shown in FIG. 7, the functions and operations of STB 701 may be governed by a controller 707, which performs the actions adapter functions as explained with respect to FIG. 2A to interpret sensor information from mobile phone 703. Additionally, controller 707 interacts with each of the STB components to provide programming guide information and related content retrieved from an audio or video-sharing site, as well as from another STB device or component of system 100. In turn, the user may be afforded greater functionality utilizing a control device 709 to control the personalized programming guide service and related services, as will be more fully described below. As later explained, remote control functions can also be provided by mobile phone 703.

STB 701 may be configured to communicate with a number of user devices, including: a PC 711, laptops, PDAs, cellular phones (e.g., device 703), mobile devices, handheld devices, as well as any other equivalent technology capable of capturing and storing media. According to another embodiment, computer 711, as a user device, can also be configured with a slideshow module 711a to transfer media 711b to STB 701 for presentation to display 715.

As such, STB 701 may be configured to provide an indicator that the STB 701 is being controlled by the mobile unit 703 on (or at) display 715. In one embodiment, presentation of the media (or content) may include: displaying, recording, playing, rewinding, forwarding, toggling, selecting, zooming, or any other processing technique that enables users to manipulate the media. For instance, STB 701 may provide one or more signals to the display 715 (e.g., television) so that the display 715 may present the media, as images, audio, video, or any combination thereof. A communication interface (not illustrated) of PC 711 may be configured to retrieve the programming and content information over the data network (e.g., packet-based network 105), wherein STB 701 may receive a programming content stream from PC 711 to present to the user via display 715.

STB 701 may also interact with a PVR, such as digital video recorder (DVR) 719, to store received content that can then be manipulated by a user at a later point in time. In various embodiments, DVR 719 may be network-based, e.g., included as a part of the service provider network 101, collocated at a subscriber site having connectivity to STB 701, and/or integrated into STB 701.

Furthermore, STB 701 may include a communication interface 725 configured to receive content streams from the programming service provider 111, PC 711, server (not shown), or other programming content source, such as media source 703. Communication interface 725 may optionally include single or multiple port interfaces. For example, STB 701 may establish a broadband connection to multiple sources transmitting content to STB 701 via a single port, whereas in alternative embodiments, multiple ports may be assigned to the one or more sources. In still other embodiments, communication interface 725 may be configured to permit users, via STB 701, to transmit data (including media content) to other users with STBs, a programming service provider 111, or other content source/sink.

According to various embodiments, STB 701 may also include inputs/outputs (e.g., connectors 727) to display 715 and DVR 719, as well as an audio system 729. In particular, audio system 729 may comprise a conventional audio-video receiver capable of monaural or stereo sound, as well as multichannel surround sound. Audio system 729 may include speakers, ear buds, headphones, or any other suitable component configured for personal or public dissemination. As such, STB 701, display 715, DVR 719, and audio system 729, for example, may support high resolution audio and/or video streams, such as high definition television (HDTV) or digital theater systems high definition (DTS-HD) audio. Thus, STB 701 may be configured to encapsulate data into a proper format with required credentials before transmitting onto one or more of the networks of FIG. 1 and de-encapsulate incoming traffic to dispatch data to display 715 and/or audio system 729.

In an exemplary embodiment, display 715 and/or audio system 729 may be configured with internet protocol (IP) capability (i.e., includes an IP stack, or is otherwise network addressable), such that the functions of STB 701 may be assumed by display 715 and/or audio system 729. In this manner, an IP ready, HDTV display or DTS-HD audio system may be directly connected to one or more service provider networks 101, packet-based networks 105, and/or telephony networks 107. Although STB 701, display 715, DVR 719, and audio system 729 are shown separately, it is contemplated that these components may be integrated into a single component, or other combination of components.

Authentication module 733 with STB 701 may also be responsible for detecting and authenticating one or more user devices 703. Additionally, authentication module 733 may be provided to initiate or respond to authentication schemes of, for instance, service provider network 101 or various other content providers, e.g., broadcast television systems 123, third-party content provider systems 125, or servers 119. Authentication module 733 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 701 may identify and authenticate a second device (e.g., PC 711) communicatively coupled to, or associated with, STB 701, or vice versa. Further, authentication information may be stored locally at memory 731, in a repository (not shown) connected to STB 701, or at a remote repository, e.g., user profile repository 121.

Authentication module 733 may also facilitate the reception of data from single or disparate sources. For instance, STB 701 may receive broadcast video from a first source (e.g., IPTV system 111), signals from a second source (e.g., server 119), and a programming content stream from a third source accessible over a data network (e.g., content repository 109). As such, display 715 may present the broadcast video and programming content stream to the user. This presentation may be experienced separately, concurrently, in a toggled fashion, or with zooming, maximizing, minimizing, or trick capabilities, or equivalent mode.

Connector(s) 727 may provide various physical interfaces to display 715, audio system 729, as well as other peripherals; the physical interfaces may include, for example, RJ45, RJ11, high definition multimedia interface (HDMI), optical, coax, FireWire, wireless, and universal serial bus (USB), or any other suitable connector. The presentation module 735 may also interact with a control device 709 for determining particular media content that a user desires to experience. In an exemplary embodiment, the control device 709 may comprise a remote control (or other access device having control capability, such as a PC 711, wireless device, mobile phone, etc.) that provides a user with the ability to readily manipulate and dynamically change parameters affecting the device event-based STB control service. In other examples, STB 701 may be configured for voice recognition such that STB 701 may be controlled with spoken utterances.

In addition to the user device 703 being configured to control the manner in which STB 701 behaves in response to device events, STB 701 may also permit control device 709 to activate and deactivate the device event-based STB control service. In this manner, control device 709 may include (not shown) a cursor controller, trackball, touch screen, touch pad, keyboard, and/or a key pad for activating a slideshow application, selecting programming content, as well as performing other control functions. Control device 709 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 709 may comprise a memory (not illustrated) for storing preferences relating the device event-based STB control service; such preferences can be conveyed to STB 701 through an input interface 737. The input interface 737 may support any type of wired and/or wireless link, e.g., infrared, radio frequency (RF), BLUETOOTH™, and the like. Thus, control device 709 may store user preferences with respect to the parameters associated with the device event-based STB control service. Alternatively, user preferences may be tracked, recorded, or stored in STB 701 or in a network user profile repository 121. The preferences may be automatically retrieved and activated by a user at any time. It is noted that the control device 709 may be separate from STB 701 or may be integrated within STB 701 (in which case certain input interface hardware and/or software may not be necessary).

Particular embodiments enable users, via control device 709, to populate or otherwise configure a user profile. For instance, a user profile application may be provided or accessed by STB 701 to enable users to populate a plurality of entry fields with user information. A user profile may include one or more customized or personalized settings relating to the slideshow application, as well as other content and applications. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible programming content sources/subjects, a "blacklist" specifying one or more programming content sources/subjects, as well as other equivalent customized settings, such as color schemes, sound effects, etc.

Thus, under the above arrangements of FIG. 7, a mobile phone 703 can conveniently provide control commands based on sensor information to control applications executed by STB 701.

FIG. 8 is a diagram of a wireless environment in which user devices and set-top boxes interact to provide control of the set-top boxes based on sensor information of the user devices, according to an exemplary embodiment. In this example, one or more STBs 801 operates within a wireless local area network (LAN) through the use of a wireless router 803, using Wi-Fi. The router 803 provides connectivity among multiple wireless user devices 805a-805n (e.g., mobile phone with Wi-Fi capability, PDA, etc.) and a computer device 807. Also, wireless router 803 links to an external data network 808— e.g., service provider network or global Internet.

This arrangement can enable use of mobile phone, for example, as control devices for the computer 807 and set-top box 801. Such an environment can support devices that are Wi-Fi enabled; alternatively, wired connections can be utilized—e.g., an Ethernet cable from computer device 807 to router 803, either directly or through another network component such as a hub.

STB 801 includes a device event module 801a configured to operate with a communication module 801b to permit wireless user device 805 and computer device 807 to process control signals related to device events, such as sensor events. As shown, STB 801 outputs to a display 809. In one embodiment, device event module 801a receives commands from wireless user device 805; as explained, the commands are generated in response to sensor events. Device event module 801a, among other functions, is responsible for "listening" to incoming requests devices 805, 807, and to determine whether devices 805, 807 are authorized to control certain functions and applications of STB 801. Although not shown, terminal 807 may also include a STB control module for generating control signals to STB 801. The authorization procedure is more fully described with respect to FIGS. 11A-11C.

Additionally, user device 805 includes a communication module 805a (executing a communication protocol 805b), and memory 805d configured to store instructions for the communication protocol 805b.

To coordinate the processing of sensor events, user device 805 and STB 801 employ communication protocol 805b to create a communication channel for transport of data messages as well as command (or control) messages. As mentioned, the communication protocol can utilize transport protocols, such as Transmission Control Protocol (TCP) or User Datagram Protocol (UDP) over Internet Protocol (IP).

Figure 9:
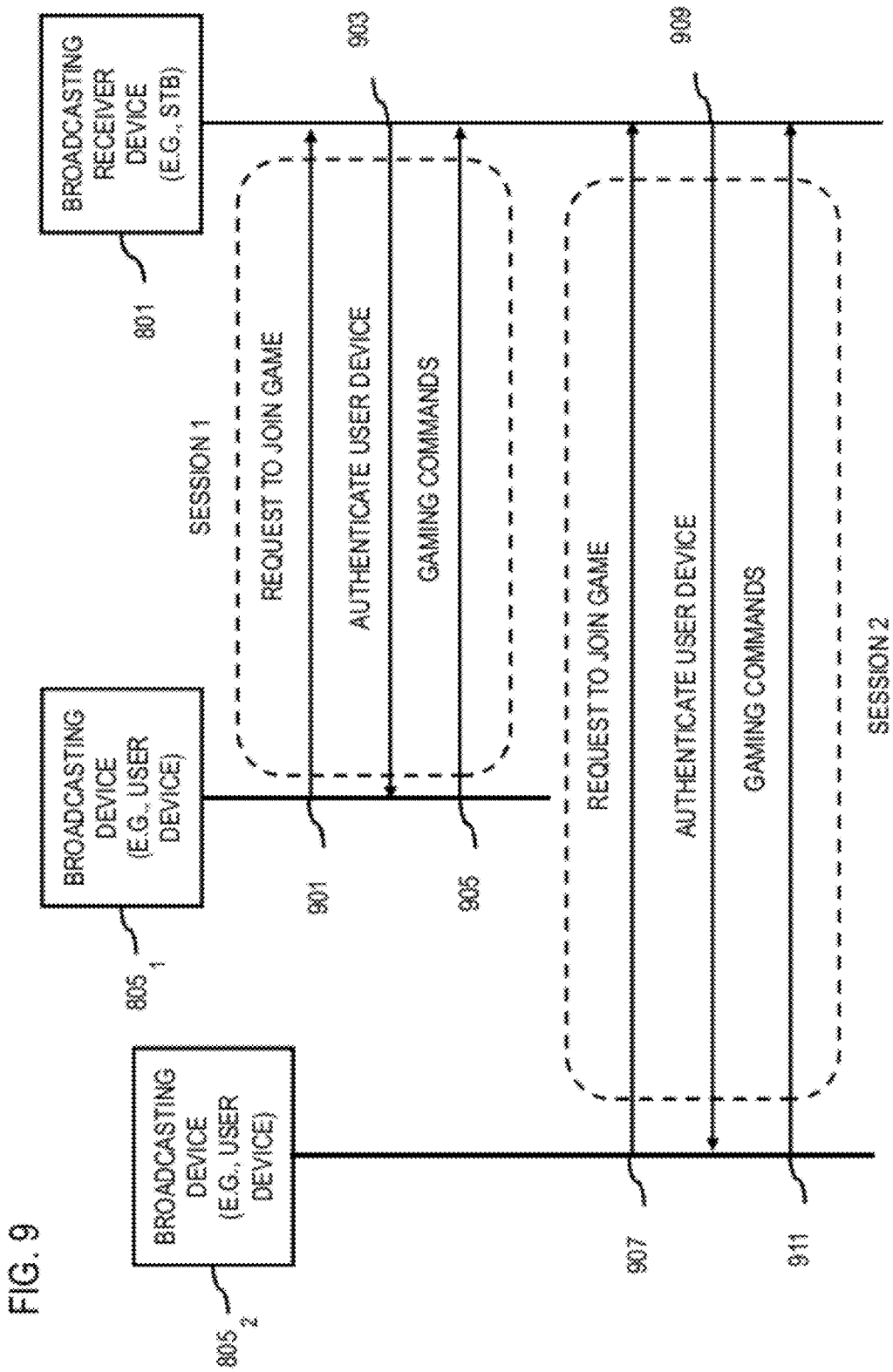
FIG. 9 is a flowchart of a process for providing simultaneous sessions for a gaming program executed by a STB, according to an exemplary embodiment.

FIG. 9 is a flowchart of a process for providing simultaneous sessions for a gaming program executed by a STB, according to an exemplary embodiment. Continuing with the example of FIG. 8, under this scenario, multiple user devices 805 (depicted as $805_1$ and $805_2$) participate in a multi-player video game that is executed by STB 801. As seen, multiple communication sessions (e.g., two) are concurrently supported over Session 1 and Session 2. To establish Session 1, user device 805$_1$ generates a request to join the video game, as in step 901. STB 801 in turn authenticates, as in step 903, user device 805$_1$. Thereafter, gaming commands that are generated based on sensor events are transported to STB 801, per step 905. Similarly, user device 805$_2$ can request to engage in the video game, per steps 907-911. Although only two user devices 805 are shown, it is contemplated that more user devices 805 can be supported.

The described processes for transporting sensor events, in certain embodiments, are performed according to a Simple and Extensible Transmission Protocol (SETP), as next detailed.

FIGS. 10A and 10B are diagrams of a communication protocol and associated messaging formats for controlling STB applications based on sensor events, according to various embodiments. As shown in FIG. 10A, in certain embodiments, a Simple and Extensible Transmission Protocol (SETP) 1001 rests above a Transmission Control Protocol (TCP) or User Datagram Protocol (UDP) layer 1003. Also, the Internet Protocol (IP) 1005 can be utilized. These protocols 1001-1005 can configured to operate in a variety of wireless transport environments. For the purposes of illustration, the SETP 1001 is explained with respect to a Wi-Fi environment.

In one embodiment, SETP 1001 is a binary protocol that resides within the application layer (of the Open System Interconnect (OSI) model). SETP 1001 can be used to send various commands and command related information along with command data. SETP 1001 utilizes predefined command headers, thereby advantageously requiring less processing time. Also, this protocol is efficient as the commands are pre defined and the decoding can be simple. Further, SETP 1001 is fast, in that the processing of the commands follow different logical branches for different commands.

As mentioned, SETP 1001 can be configured to support different transport mechanisms. For instance, the addition of new transport mechanisms and associated commands can be readily accommodated. The commands and data to be transferred are secure in that SETP 1001 is session based. Accordingly, passwords are never "sent out through wire"; consequently, the password need not be changed frequently.

SETP 1001 can be used to build different applications. Although SETP 1001 is primarily described herein for the communication between STBs and user devices, SETP 1001 can also be used to communicate between any other applications/devices/PCs to transfer commands and data.

As depicted in FIG. 10B, a command message (or referred to as command packet in the case of IP) 1007 includes only a header. A data message (data packet) includes a header 1009$a$ and a payload 1009$b$.

The SETP header structure 1009$a$ includes 70 bytes. This header is used to carry all the commands, data and events. Table 15 below enumerates the fields in the header, according to certain embodiments.

TABLE 15

Protocol ID (1 Unsigned Byte)
Protocol Version (1 Unsigned Byte)
Protocol Subversion (1 Unsigned Byte)
Transport (1 Unsigned Byte)
Command (2 Unsigned Bytes)
Command Sequence (1 Unsigned Byte)
Time stamp (4 Unsigned Byte)
Proxy Info (6 Unsigned Byte)
From Info (6 Unsigned Byte)
To Info (6 Unsigned Byte)

TABLE 15-continued

Auth Info (32 Unsigned Byte)
Sub Command (1 Unsigned Byte)
Flags (2 Unsigned Bytes)
Reserved (2 Unsigned Byte)
Payload Length (4 Unsigned Byte)

The Protocol Identifier (ID) field identifies the particular message or packet. For example, the Protocol Identifier can be defined as 'V' such that all packets associated with this protocol should have the ID as 'V'. Also, a Protocol Version field can be provided to denote the major version of the protocol. This major version can be changed either for a major functionality change or if the protocol subversion reaches a predetermined limit. The Protocol Subversion field specifies the sub version of the protocol. For every new addition, alteration and modification of this draft requires either this field's increment or the version field's increment.

Transport field denotes the transport mechanism used by the protocol to communicate with other devices, as SETP is designed to accommodate different transports; e.g., TCP over Wi-Fi, and the UDP over the Wi-Fi (the values are specified in Table 16):

TABLE 16

SETP_TRANSPORT_WIFITCP = 1
SETP_TRANSPORT_WIFIUDP = 2

A Command field identifies the command carried by the protocol. Also, a Command Sequence field denotes the sequence number of the packet sent. For instance, the sequence can start from 0 to 255. Once the value reaches 255, the sequence of the next packet will be 1. By way of example, the sequence number is zero for new commands. This sequence increases if a command/data packet sends its continuation packet.

A Time Stamp field specifies the timestamp of the packet generated. This field can be based on GMT (Greenwich Mean Time) time zone. In one embodiment, for the continuation packets, the timestamp can be the same as the initial packet. The Time Stamp field can be used to combine the divided data packets of the same command.

A Proxy Info field specifies the IP address of the proxy. For the protocol supported in this version, this field is set as the IP address of the endpoint device. This field is particularly useful when TCP and UDP are employed.

A From Info field has the IP address of the packet originator. Also, a To Info field is provided to specify the information of the destination.

An Auth Info field indicates the Session ID established through the initial hand shaking.

A Sub Command field is provide to specify any additional information about the command. The values of this Sub Command field can be interpreted differently for different commands.

SETP 1001 also provides fields for flags, which can include two bytes to be used to specify the bit level information about the packet. The defined bit values are given below in Table 17:

TABLE 17

| Bit Position(From most significant bit) | Description if set |
|---|---|
| 1 | Denotes Originator |
| 2 | It has the continuing packets |

TABLE 17-continued

| Bit Position(From most significant bit) | Description if set |
|---|---|
| 3 | It is the continuing packet |
| 4 | If this command is the proprietary |
| 5 | If this device starts the TCP channel first |
| 6 | Denotes big endian |

A Reserved field is provided for future development.

A Payload Length field indicates the length of the payload of the command packet. If this field is zero, for instance, the packet is recognized as a command packet 1007. If this field is not zero and carries some information, this packet is recognized as a data packet 1009. If stream oriented protocols are used as the transport, the next immediate length bytes are read and appended as the payload of this packet. There need not be any constraint on format or the manner in which the payload is manipulated and handled. However, the payload data can be specified in the name, length and value pair, for example. In this manner, SETP 1001 can accommodate different proprietary headers and different objects at the same time.

Regarding command packets and data packets (shown in FIG. 10B), as mentioned, packets that have only headers are defined as command packets. If the packet has both the header and payload data, these packets are designated as data packets. According to some embodiments, the payload of the data packets follow the NLV (Name, Length and Value order) structure. Table 18 lists exemplary header names and codes:

TABLE 18

| Name value (1 unsigned byte) | Description |
|---|---|
| 0 | End indicator |
| 1 | Contains "Name" |
| 2 | Type |
| 3 | Content or data |
| 4 | Algorithm |
| 5 | Nonce key |
| 6 | Key Limit |
| 7 | Key |
| 8 | IP |
| 9 | Port |
| 10 | Transport |
| 11 | Session support |
| 12 | Transport Support |
| 13 | Media Support |
| 14 | Length Support |
| 15 | Session Init Time |
| 16 | Session Validity |
| 17 | Max payload support |
| 18 | Binary data model (Big/Little endian) |
| 19 | ID |
| 20 | Size |
| 21 | MAC |

Table 19 provides common subcommands in the responses:

TABLE 19

| Sub Command | Description |
|---|---|
| 1 | OK |
| 2 | NOT_AUTHORIZED |
| 3 | NOT_AUTHENTICATED |
| 4 | FILETYPE_NOT_SUPPORTED |
| 5 | VERSION_NOT_SUPPORTED |
| 6 | TRANSPORT_NOT_SUPPORTED |
| 7 | GENERAL_ERROR |
| 8 | ERROR_PROCESSING_REQUEST |
| 9 | COMMAND_NOT_SUPPORTED |
| 10 | SUBCOMMAND_NOT_SUPPORTED |
| 11 | NOT_AVAILABLE |
| 12 | INVALID_HEADER |
| 13 | INVALID_PAYLOAD |

By way of example, the commands that are supported by SETP 1001 fall into two categories: (1) authenticated commands, and (2) unauthenticated commands. The authenticated commands are the commands can be used only after the authentication, while the unauthenticated commands can be used in both authenticated and unauthenticated sessions.

In addition, SETP 1001 utilizes a Broadcast field to specify broadcasting commands: SETP_COMMAND_BROADCAST=1.

Regarding the payload 1009b, a payload that is sent during the initial handshaking negotiation is denoted as "the resource capability payload." In certain embodiments, there are nine headers that are defined in this payload. These headers are followed in the name, length and value combination, as shown in Table 20.

TABLE 20

| Description | Name (1 Unsigned Byte) | Length (2 unsigned Bytes) | Value |
|---|---|---|---|
| Binary Data Model(1 - Little Endian 2 - Big Endian) | 18 | 1 | 2 |
| Algorithm (Any SHA family algorithms can be used) | 4 | 1 | 1 (denotes SHA-1) |
| Nonce value | 5 | 1 | 0 (use the time stamp from the command header) |
| Key Limit (To denote the range of keys sent from the keys generated) | 6 | 4 | First 2 bytes denotes "starts from". Second 2 bytes denotes "ends with". 0 for the first byte and 31 for the second byte |
| Key (It combines the "user id + password + nonce" and makes it as a single string. Then the SHA-1 algorithm will be applied to this header to get the 32 bit key. This key will be sent in this field.) | 7 | 32 | Holds the key generated |
| IP | 8 | 6 bytes | 0 (Means the IP will be taken from the IP packet's header) |
| Port | 9 | 2 | Port Number |
| Transport Preference | 10 | 1 | 1 (to denote the TCP over Wi-Fi preference for the communication) |
| Display Name | 1 | Length of the "display name" | Optional Display name (Ex, "SoftRemote") |

In SETP 1001, an Init Session command is used for authorization, and specifies a payload according to the capabilities that are supported. This Init Session command requires a response, which in turn, requires an acknowledgement (INIT ACK). If the validation fails, the connection is closed. The values of the command are as follows in Table 21:

TABLE 21

SETP_COMMAND_INITREQUEST = 3
SETP_COMMAND_INITRESPONSE = 4

For example, in the INIT ACK, the command is '4' and the sub command is '1'. The payload is defined according to Table 22:

TABLE 22

| Description | Name (1 Unsigned Byte) | Length (2 unsigned Bytes) | Value |
| --- | --- | --- | --- |
| Binary Data Model | 18 | 1 | 2 |
| Display Name | 1 | Length of the name value | |
| Algorithm (1 - SHA-1) | 4 | 1 | 1 |
| Nonce key | 5 | 1 | 0 (use the time stamp from the command header) |
| Key Limit | 6 | 4 | First 2 bytes denotes "starts from". Second 2 bytes denotes "ends with". 0 for the first byte and 31 for the second byte |
| Generated Key (This NLV is send only with the hand shaking response and acknowledgement) | 7 | 32 | |
| Session support | 11 | 4 | |
| Transport Support | 12 | 2 | |
| Media Support | 13 | 4 | |
| Length Support | 14 | 4 | |
| Session Init Time | 15 | 6 | |
| Session Validity | 16 | 4 | Validity time in sec. (Once this validation time is over, it can challenge the other end using the 'Authenticate request') |
| Max Payload Support | 17 | 4 | |

SETP 1001 also defines an End Session command, which is used to close/stop the session (e.g., SETP_COMMAND_ENDREQUEST=5). The response is not mandatory for this command.

Further, a Cancel Transfer command is provided for aborting a file transfer. No subcommand or payload is needed. An example of such command is as follows: SETP_COMMAND_CANCELTRANSFERREQUEST=11.

A Channel Change Command relates to changing a channel. This command, according to one embodiment, as an associated response; an example is as follows: SETP_COMMAND_CHANNELCHANGEREQUEST=17. If the requested channel is not found, the response can indicate a sub command of '11'. An exemplary payload is provided below in Table 23:

TABLE 23

| Description | Name (1 Unsigned Byte) | Length (2 unsigned Bytes) | Value |
| --- | --- | --- | --- |
| Channel ID | 19 | 4 | |
| Channel Name | 1 | Length of Name | |

A File Display Command is supplied to send a file for display by the receiver. This command has an associated response, which indicates status of the file display. The payload, as detailed in Table 10, can be sent in multiple packets, whereby all the continuation packets only have the File content NLV. Such command is as follows: SETP_COMMAND_FILEDISPLAYREQUEST=19.

TABLE 24

| Description | Name | Length | Value |
| --- | --- | --- | --- |
| File Name | 1 | Length of the file name given in the value | Actual file name |
| File Type | 2 | 2 | File type in the bit representation |
| File Size | 20 | 4 | Total file size |
| File Content | 3 | Length of the content | Content of the file |

SETP 1001 also provides a GTP Payload command, which is used to transfer the GTP content. In one embodiment, a response is mandatory for this command (e.g., SETP_COMMAND_GTPREQUEST=21). Table 25 enumerates the sub commands:

TABLE 25

ERROR = 0
CATG_REQ = 1
CATG_RES = 2
CH_REQ = 3
CH_RES = 4
PI_REQ = 5
PI_RES = 6
PD_REQ = 7
PD_RES = 8

A Search Command accommodates a generalized search; such command is as follows: SETP_COMMAND_SEARCHREQUEST=23. Table 26 shows the associated sub commands.

TABLE 26

SEARCH_START = 1
SEARCH_STOP = 2
SEARCH_KEYDATA = 3
SEARCH_DATA = 4
SEARCH_RESET = 5

To initiate a search, a 'search start' command is sent. Each and every key that is input is transmitted as key data. Also, a 'search stop' command specified to end the search. Table 27 provides an exemplary payload:

TABLE 27

| Description | Name | Length | Value |
|---|---|---|---|
| Data | 3 | Length of the data in case of 'data'. '1' in case of the 'key data'. | value to be searched. |

A General Response command is provided to alert the other device about some general predefined responses. No payload need be specified. This command (e.g., SETP_COMMAND_GENERALRESPONSE=25) can be sent as a response for any request. Table 28 lists the sub commands:

TABLE 28

OK = 1
NOT_AUTHORIZED = 2
NOT_AUTHENTICATED = 3
FILETYPE_NOT_SUPPORTED = 4
VERSION_NOT_SUPPORTED = 5
TRANSPORT_NOT_SUPPORTED = 6
GENERAL_ERROR = 7
ERROR_PROCESSING_REQUEST = 8
COMMAND_NOT_SUPPORTED = 9
SUBCOMMAND_NOT_SUPPORTED = 10
NOT_AVAILABLE = 11

An Authenticate Request command permits the other device to authenticate itself (for the nonce value provided by the device). This request has a response; if the response is not proper, the session is closed. The latest key generated will be used as the Session ID for the remaining session. The command and response are as follows:

TABLE 29

SETP_COMMAND_AUTHENTICATEREQUEST = 27
SETP_COMMAND_AUTHENTICATERESPONSE = 28

The payload is listed in Table 30:

TABLE 30

| Description | Name | Length | Value |
|---|---|---|---|
| Algorithm (1 - SHA-1) | 4 | 1 | 1 |
| Nonce key | 5 | 1 | 0 (use the time stamp from the command header) |
| Key Limit | 6 | 4 | First 2 bytes denotes "starts from". Second 2 bytes denotes "ends with". 0 for the first byte and 31 for the second byte |
| Generated Key (This NLV is send only with the hand shaking response and acknowledgement) | 7 | 32 | |

A Remote Control Command is provided for sending the remote control keys to the receiving side. A response this type of command is not needed. An example of the Remote Control Command is SETP_COMMAND_REMOTECONTROLREQUEST=29. Table 31 shows the sub commands:

TABLE 31

RC_KEY_POWER = 0
RC_KEY_MUTE = 1
RC_DEVICEKEY_STB = 2
RC_DEVICEKEY_AUX = 3
RC_DEVICEKEY_DVD = 4
RC_DEVICEKEY_TV = 5
RC_KEY_MENU = 6
RC_KEY_GUIDE = 7
RC_KEY_INFO = 8
RC_CONTROL_UP = 9
RC_CONTROL_DOWN = 10
RC_CONTROL_LEFT = 11
RC_CONTROL_RIGHT = 12
RC_CONTROL_OK= 13
RC_KEY_EXIT = 14
RC_KEY_OPTIONS = 15
RC_KEY_WIDGETS = 16
RC_KEY_ONDEMAND = 16
RC_KEY_FAVOURITES = 17
RC_KEY_JUMP =18
RC_KEY_FIOSTV = 19
RC_KEY_CHANNELUP = 20
RC_KEY_CHANNELDOWN = 21
RC_KEY_VOLUMEUP = 22
RC_KEY_VOLUMEDOWN = 23
RC_KEY_SKIPBACK = 24
RC_KEY_SKIPFORWARD = 25
RC_KEY_DVR = 26
RC_KEY_PLAY = 27
RC_KEY_STOP = 28
RC_KEY_PAUSE = 29
RC_KEY_FORWARD = 30
RC_KEY_BACKWARD = 31
RC_KEY_REC = 32
RC_KEY_1 = 33
RC_KEY_2 = 34
RC_KEY_3 = 35
RC_KEY_4 = 36
RC_KEY_5 = 37
RC_KEY_6 = 38
RC_KEY_7 = 39
RC_KEY_8 = 40
RC_KEY_9 = 41
RC_KEY_0 = 42
RC_KEY_ASTERISK = 43
RC_KEY_HASH = 44
RC_CONTROLKEY_A = 45
RC_CONTROLKEY_B = 46
RC_CONTROLKEY_C = 47
RC_CONTROLKEY_D = 48
RC_KEY_INPUT = 49
RC_KEY_PIP = 50
RC_KEY_PIPCHANGE = 51

A Device Info Request command permits the sending (or source) device a way to obtain device information of the receiving device (or destination).

Table 32 lists the commands:

TABLE 32

SETP_COMMAND_DEVICEINFOREQUEST = 33
SETP_COMMAND_DEVICEINFORESPONSE = 34

Table 33 lists the associated payload.

TABLE 33

| Description | Name | Length | Value |
|---|---|---|---|
| Display Name | 1 | Length of the Name | |
| MAC Address | 21 | 6 | |

Figure 11A:
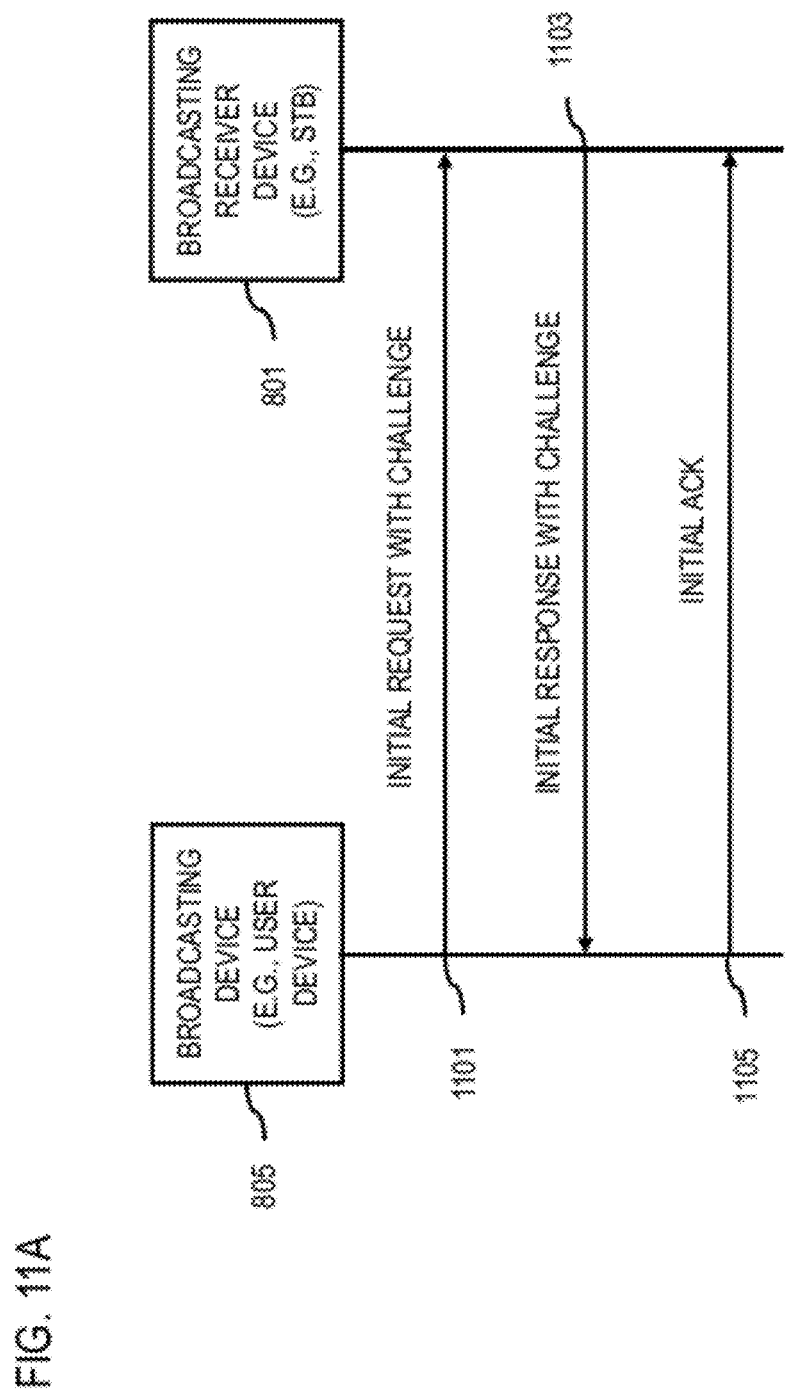
Figure 11B:
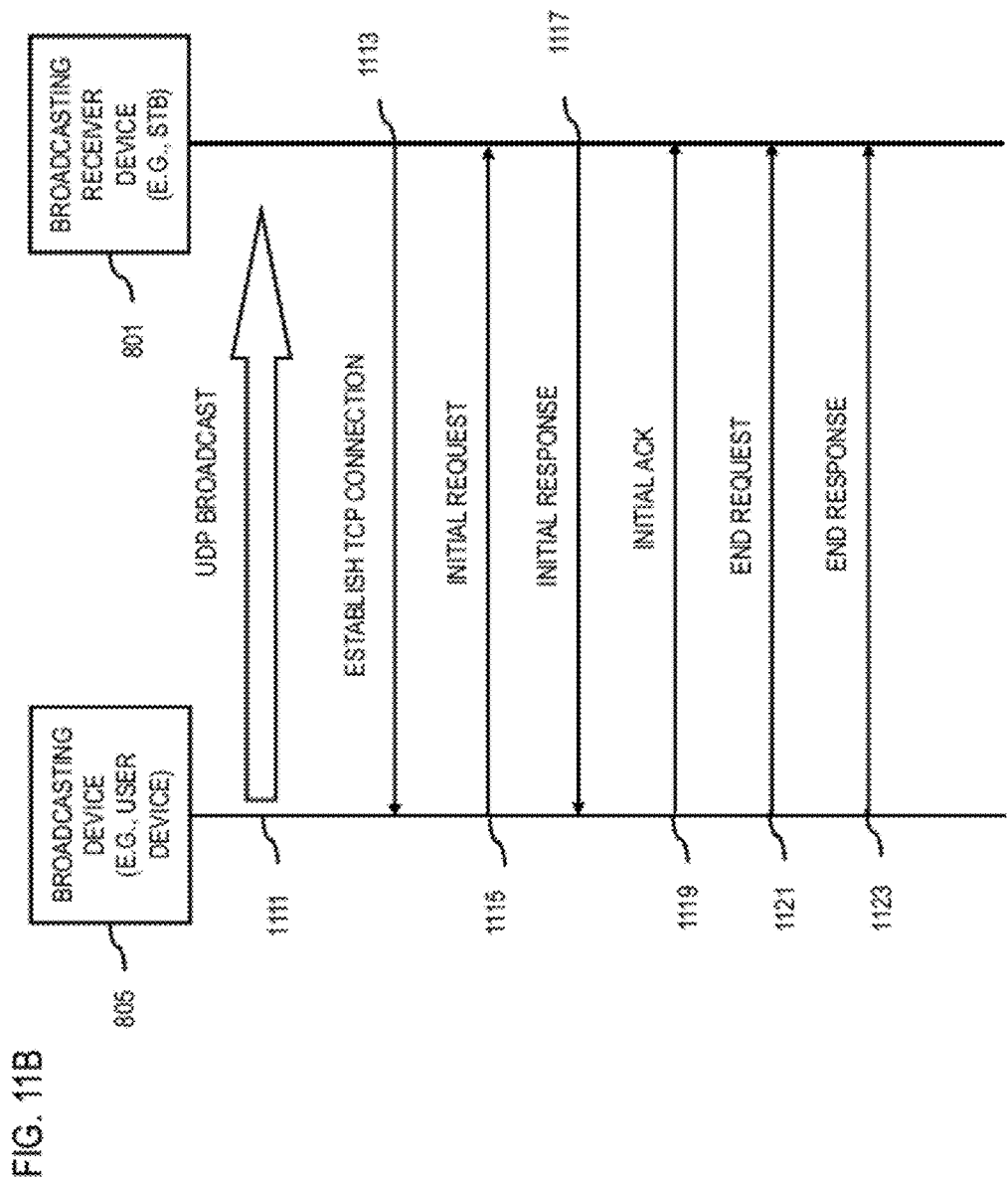

FIGS. 11A-11C are flowcharts of processes for establishing communication between a user device and a set-top box, according to various embodiments. By way of example, these processes associated with SETP 1001 are explained with respect to the system of FIG. 8, wherein communication is established between a user device 805 and set-top box 801.

FIG. 11A shows a ladder diagram of a handshaking mechanism that is supported by SETP 1001. In this example, user device 805 and STB 801 are assigned a User ID and password (or passcode); the assignment of these credentials can be managed by a service provider according to one embodiment. Under this scenario, the devices 805 can communicate if both of their credentials are same. In this manner, it would be apparent that the user is common to user device 805 and STB 801. According to certain embodiments, a key is generated from the User ID and password (e.g., a personal identification number (PIN)) will be sent as part of broadcast packets. Under this arrangement, there is flexibility for interested devices to establish a communication channel with the broadcasting device.

As shown, user device 805 is referred to as a "broadcasting device," while STB 801 is the "broadcasting receiver device." For instance, when the broadcast receiver 801 decides to communicate with the broadcasting device 805, the receiver 801 establishes a communication channel (e.g., TCP session or channel) with the broadcasting device 805. If the connection is not authenticated using, for example, an initial hand shaking within a predetermined period (e.g., 120 seconds) of the connection being opened, the connection is closed. When the connection is accepted by device 805, device 805 challenges with the initial hand shaking request. Thus, in step 1101, user device 805 generates a request with challenge for transmission to STB 801. In turn, the broadcasting receiver device 801 can submit a response along with the challenge, per step 1103. Upon receiving the response, device 805 can send an acknowledgement message (ACK) to positively indicate successful receipt of the response (step 1105). Once this procedure is completed, the session is secured. The challenge response can be used as the Session ID for the entire session.

In one embodiment, the common (or least) capabilities transmitted during the above hand shaking negotiation process can be used as the session capability for the whole session. If the session capability rules are violated by any command, such rules can be responded with a "Not Supported" response.

According to certain embodiments, all the further communications between device 801 and device 805 will be conducted over this TCP channel in the case of TCP transport. If the TCP connection is broken, the described authentication procedure is performed again for the new communication channel. That is, on successful handshake, both the originator and terminator devices can maintain the TCP channel for the whole session. This TCP channel can be closed and opened at any point of time during the communication. Each re-opening of communication channel requires the described handshaking mechanism to be performed for the authentication. The command and data packets (which were described above) can be sent through this established channel. The connection will be closed if the authentication or authorization fails. Also, an established communication channel can be closed by sending a session close command; however, closing the TCP channel can also terminate this session.

FIG. 11B shows a process for detecting a user device, according to one embodiment. In step 1111, user device 805 generates a message, e.g., UDP broadcast message, for transmission to STB 801. SETP 1001, in certain embodiments, provides for binding and listening on predetermined port for both the TCP and UDP packets. The device that does not want to be detected need not start a UDP server. Similarly in the case in which a device does not want to support the detection mechanism (and only wants to be an originator all the time), such device also need not start the TCP server. If a device wants to support the detection mechanism (and only wants to be the terminator), the particular device need not start the TCP server, but needs to start the UDP server.

The terminator (STB 801 in this example) can listen on the same port for both the TCP and UDP packets. When an originating device wants to detect other SETP responders, such device generates the UDP broadcasting packets. Upon detection of this broadcast message, STB 801 initiates establishment of a TCP connection (per step 1113), using the handshaking procedure of FIG. 11A (as in steps 1115-1110). Hence, by receiving this broadcasting packet, the receiving device 801 (terminator) can establish a TCP communication channel with device 805.

In this example, user device 805 submits an End Request message to STB 801, per step 1121. Also, user device 805 sends an End Response message, as in step 1123, to STB 801.

FIG. 11C illustrates a signaling flow for authenticating a user device using SETP 801, according to one embodiment. This example addresses how SETP 1001 ensures session security and data security. In certain embodiments, the SHA family of algorithms (SHA-1) is employed by SETP 1001 for the encryption. As seen, an initial "SETP BROADCAST" packet is sent, per step 1151, by user device 805. The BROADCAST packet carries a SHA-1 key and a nonce value as its payload. The SHA-1 key is generated using the combination of the User ID, password and the nonce value (time stamp generated during the packet generation). For example, if the User ID is "51234567890", the password is "ABCD" and the time stamp is "987654321", the combined string "51234567890ABCD987654321" is formed. The resultant string is used as an input to generate the SHA-1 key.

The terminating device, STB 801, receives this BROADCAST packet and extracts the SHA key and the nonce value. Since STB 801 also is aware of the User ID and password, STB 801 generates the SHA key using the nonce value (extracted from the BROADCAST packet) sent by the originator. If the resultant SHA key generated by the terminator is the same as the one received from the originator 805, a TCP communication channel can be established with originator, user device 805.

In step 1153, STB 801 accepts the TCP connection, and challenges user device 805 with the SETP INIT REQUEST. This request, for example, includes a nonce value as a payload. Once device 805 receives this INIT REQUEST, device 805 generates the SHA key using the User ID, password and the nonce value (received from the terminator 801). User device 805 challenges STB 801 with a nonce value and with the SHA key through the SETP INIT RESPONSE, per step 1155.

When STB 801 receives this INIT RESPONSE, STB 801 extracts the nonce value and the SHA from the INIT RESPONSE. STB 801 then responds to the challenge by generating the SHA key and sends the key through the SETP INIT ACK, per step 1157.

As both STB 801 and user device 805 successfully responded to the challenges, now they are paired and can communicate (step 1159). According to one embodiment, to ensure the communication channel is secure, set-top box 801 can periodically challenge user device 805 through a SETP AUTH REQUEST and appropriate SET AUTH RESPONSE (steps 1161 and 1163). If any of the entity fails to respond the challenges successfully, the communication channel will be closed.

The described processes and arrangement advantageously enables control of set-top boxes in response to sensor events experienced by a user device. In certain embodiments, the communication between the user device and STB is facilitated by a simple and extensible transmission protocol.

The processes described herein for providing set-top box control using sensor events may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
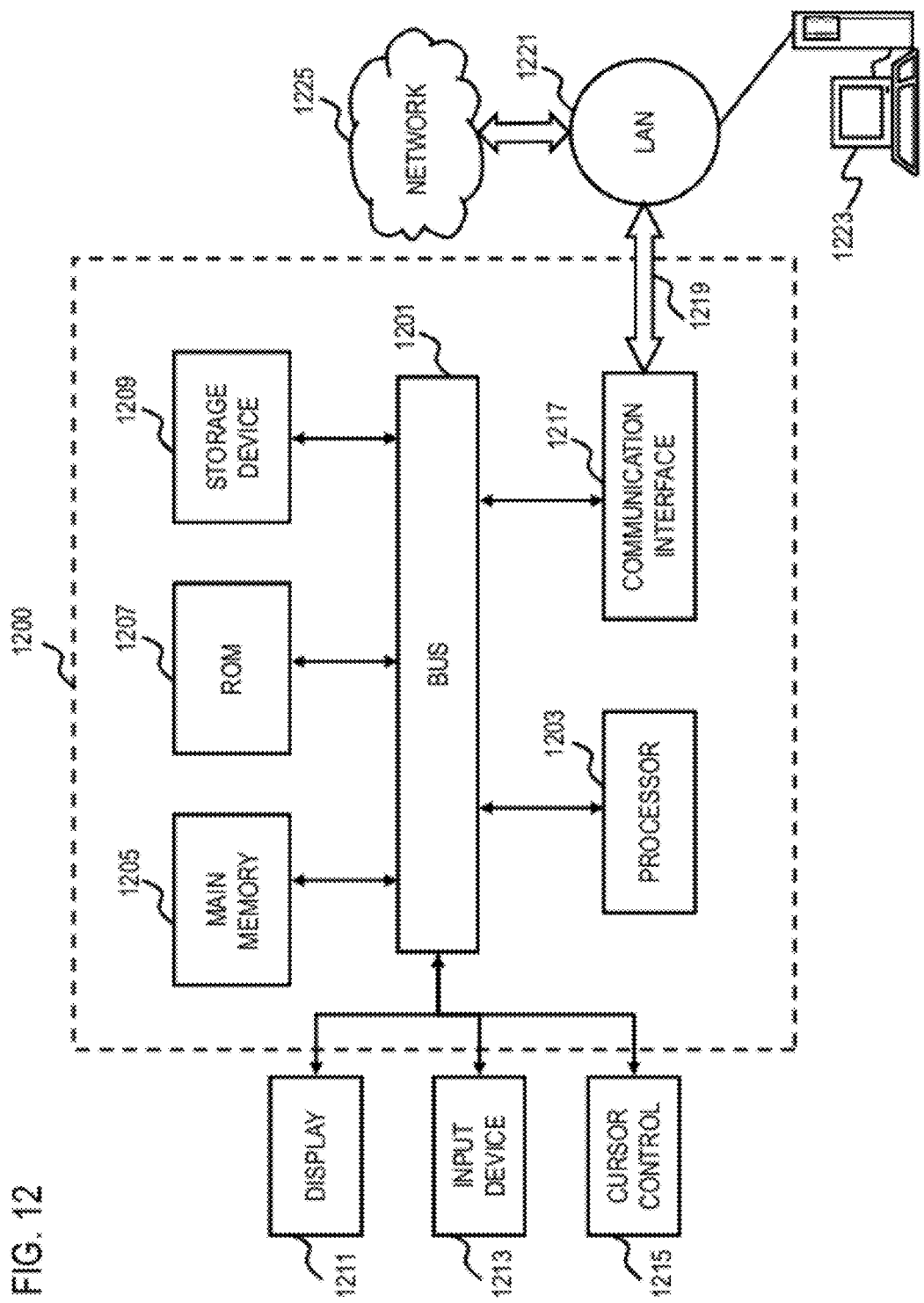
FIG. 12 is a diagram of a computer system that can be used to implement various exemplary embodiments.

FIG. 12 illustrates computing hardware (e.g., computer system) upon which an embodiment according to the invention can be implemented. The computer system 1200 includes a bus 1201 or other communication mechanism for communicating information and a processor 1203 coupled to the bus 1201 for processing information. The computer system 1200 also includes main memory 1205, such as random access memory (RAM) or other dynamic storage device, coupled to the bus 1201 for storing information and instructions to be executed by the processor 1203. Main memory 1205 also can be used for storing temporary variables or other intermediate information during execution of instructions by the processor 1203. The computer system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computer system 1200 may be coupled via the bus 1201 to a display 1211, such as a cathode ray tube (CRT), liquid crystal display, active matrix display, or plasma display, for displaying information to a computer user. An input device 1213, such as a keyboard including alphanumeric and other keys, is coupled to the bus 1201 for communicating information and command selections to the processor 1203. Another type of user input device is a cursor control 1215, such as a mouse, a trackball, or cursor direction keys, for communicating direction information and command selections to the processor 1203 and for controlling cursor movement on the display 1211.

According to an embodiment of the invention, the processes described herein are performed by the computer system 1200, in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. Thus, embodiments of the invention are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, a telephone modem, or any other communication interface to provide a data communication connection to a corresponding type of communication line. As another example, communication interface 1217 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a PCMCIA (Personal Computer Memory Card International Association) interface, etc. Although a single communication interface 1217 is depicted in FIG. 12, multiple communication interfaces can also be employed.

The network link 1219 typically provides data communication through one or more networks to other data devices. For example, the network link 1219 may provide a connection through local network 1221 to a host computer 1223, which has connectivity to a network 1225 (e.g. a wide area network (WAN) or the global packet data communication network now commonly referred to as the "Internet") or to data equipment operated by a service provider. The local network 1221 and the network 1225 both use electrical, electromagnetic, or optical signals to convey information and instructions. The signals through the various networks and the signals on the network link 1219 and through the communication interface 1217, which communicate digital data with the computer system 1200, are exemplary forms of carrier waves bearing the information and instructions.

The computer system 1200 can send messages and receive data, including program code, through the network(s), the network link 1219, and the communication interface 1217. In the Internet example, a server (not shown) might transmit requested code belonging to an application program for implementing an embodiment of the invention through the network 1225, the local network 1221 and the communication interface 1217. The processor 1203 may execute the transmitted code while being received and/or store the code in the storage device 1209, or other non-volatile storage for later execution. In this manner, the computer system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF)

and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 13:
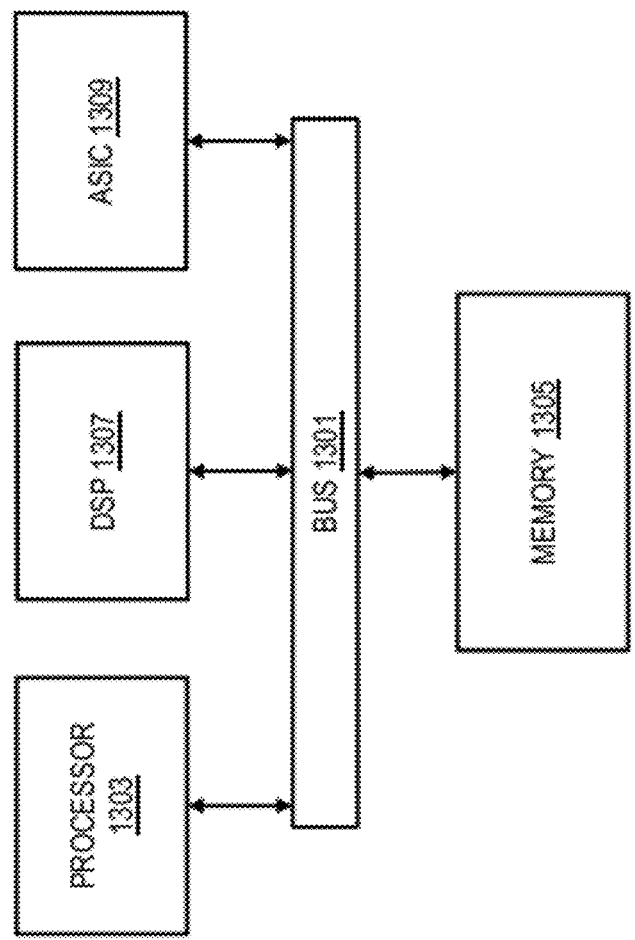
FIG. 13 is a diagram of a chip set that can be used to implement various exemplary embodiments.

FIG. 13 illustrates a chip set 1300 upon which an embodiment of the invention may be implemented. Chip set 1300 is programmed to present a slideshow as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of FIGS. 3-6, 9, and 11A-11C.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1305 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, by a set-top box, a control message from a user device configured to establish voice communications, wherein the control message specifies an event corresponding to one or more movement detection sensors of the user device;
   mapping, by the set-top box, the event to an activity of one or more characters or objects associated with a gaming application that is executed by the set-top box; and
   presenting, by the set-top box, the one or more characters or objects provided by the gaming application controlled according to the mapped activity.

2. A method according to claim 1, wherein the one or more sensors include either a gyroscope, accelerometer, light sensor, proximity sensor, temperature sensor, pressure sensor, magnetic sensor, or a combination thereof.

3. A method according to claim 1, wherein the user device is configured to translate sensor events for the set-top box.

4. A method according to claim 1, wherein the control message is received over a wireless local area network.

5. A method according to claim 1, further comprising:
   registering, by the set-top box, another user device to participate in the gaming application; and
   receiving, by the set-top box, a control message from the other user device for providing input to the gaming application.

6. A method according to claim 5, further comprising:
   authenticating the other user device to permit the participation in the gaming application.

7. An apparatus comprising:
   at least one processor; and
   at least one memory including computer program code,
   the at least one memory and the computer program code configured to, with the at least one processor, cause the apparatus to perform at least the following,
      receive, by a set-top box, a control message from a user device configured to establish voice communications, wherein the control message specifies an event corresponding to one or more movement detection sensors of the user device;
      map, by the set-top box, the event to an activity of one or more characters or objects associated with a gaming application that is executed by the set-top box; and
      present, by the set-top box, the one or more characters or objects provided by the gaming application controlled according to the mapped activity.

8. An apparatus according to claim 7, wherein the one or more sensors include either a gyroscope, accelerometer, light sensor, proximity sensor, temperature sensor, pressure sensor, magnetic sensor, or a combination thereof.

9. An apparatus according to claim 7, wherein the user device is configured to translate sensor events for the set-top box.

10. An apparatus according to claim 7, wherein the control message is received over a wireless local area network.

11. An apparatus according to claim 7, wherein the apparatus is further caused, at least in part, to:
register, by the set-top box, another user device to participate in the gaming application; and
receive, by the set-top box, a control message from the other user device for providing input to the gaming application.

12. An apparatus according to claim 11, wherein the apparatus is further caused, at least in part, to:
authenticate the other user device to permit the participation in the gaming application.

13. A method comprising:
receiving information, at a user device configured to establish voice communications, from one or more movement detection sensors within the user device;
generating a control message specifying an event corresponding to the information from the one or more sensors; and
initiating establishment of a wireless link with a set-top box to transport the control message for controlling one or more characters or objects associated with a gaming application that is executed by the set-top box.

14. A method according to claim 13, wherein the one or more sensors include either a gyroscope, accelerometer, light sensor, proximity sensor, temperature sensor, pressure sensor, magnetic sensor, or a combination thereof.

15. A method according to claim 13, further comprising:
translating sensor events for the set-top box.

16. An apparatus comprising:
at least one processor; and
at least one memory including computer program code,
the at least one memory and the computer program code configured to, with the at least one processor, cause the apparatus to perform at least the following,
receive information, at a user device configured to establish voice communications, from one or more movement detection sensors within the user device,
generate a control message specifying an event corresponding to the information from the one or more sensors, and
initiate establishment of a wireless link with a set-top box to transport the control message for controlling one or more characters or objects associated with a gaming application that is executed by the set-top box.

17. An apparatus according to claim 16, wherein the one or more sensors include either a gyroscope, accelerometer, light sensor, proximity sensor, temperature sensor, pressure sensor, magnetic sensor, or a combination thereof.

18. An apparatus according to claim 16, wherein the apparatus is further caused, at least in part, to:
translate sensor events for the set-top box.

* * * * *